United States Patent
Kobayashi

(10) Patent No.: US 9,983,004 B2
(45) Date of Patent: May 29, 2018

(54) TEMPERATURE CHARACTERISTIC CORRECTION DEVICE, TEMPERATURE CHARACTERISTIC CORRECTION FORMULA DETERMINATION METHOD, ELECTRONIC APPARATUS, AND CONTROL CIRCUIT

(71) Applicant: Seiko Epson Corporation, Tokyo (JP)

(72) Inventor: Yoshihiro Kobayashi, Komagane (JP)

(73) Assignee: Seiko Epson Corporation (JP)

(*) Notice: Subject to any disclaimer, the term of this patent is extended or adjusted under 35 U.S.C. 154(b) by 647 days.

(21) Appl. No.: 14/539,189

(22) Filed: Nov. 12, 2014

(65) Prior Publication Data

US 2015/0131695 A1 May 14, 2015

(30) Foreign Application Priority Data

Nov. 13, 2013 (JP) .................................. 2013-235407

(51) Int. Cl.
*G01K 15/00* (2006.01)
*G01C 19/5776* (2012.01)

(52) U.S. Cl.
CPC .................................. *G01C 19/5776* (2013.01)

(58) Field of Classification Search
None
See application file for complete search history.

(56) References Cited

U.S. PATENT DOCUMENTS 7,162,384 B1 * 1/2007 Browning .......... G01N 27/9046 374/100
2007/0294046 A1 * 12/2007 Browning .......... G01N 27/9046 702/99

FOREIGN PATENT DOCUMENTS

| JP | 07-306047 A | 11/1995 |
|---|---|---|
| JP | 11-211481 A | 8/1999 |
| JP | 2005-197493 A | 7/2005 |
| JP | 2006-214748 A | 8/2006 |
| JP | 2011-209000 A | 10/2011 |
| JP | 2011-255016 A | 12/2011 |

OTHER PUBLICATIONS

M. Heuvel, Computerized Analysis and Correction of Differential Scanning Calorimetric Data for Effects Due to Thermal Lag and Heat Capacity Changes, Analytical Chemistry, vol. 42, No. 9, Aug. 1970, 5 pages.*

* cited by examiner

*Primary Examiner* — Tung Lau

(74) *Attorney, Agent, or Firm* — Harness, Dickey & Pierce, P.L.C.

(57) ABSTRACT

A temperature characteristic correction device corrects a temperature characteristic of an electronic device. The temperature characteristic correction device calculates a peak correction characteristic approximating a peak waveform having a peak value in a second range included in a first range of the temperature characteristic using a first formula, and a correction characteristic approximating a waveform continuing in the first range of the temperature characteristic using a second formula. The temperature characteristic correction device calculates a total correction amount from the peak correction characteristic and the correction characteristic, and then corrects the temperature characteristic using the total correction amount.

11 Claims, 29 Drawing Sheets

TEMPERATURE CHARACTERISTIC CORRECTION DEVICE, TEMPERATURE CHARACTERISTIC CORRECTION FORMULA DETERMINATION METHOD, ELECTRONIC APPARATUS, AND CONTROL CIRCUIT

BACKGROUND

1. Technical Field

The present invention relates to a temperature characteristic correction device, a temperature characteristic correction formula determination method, an electronic apparatus, a control circuit, and so on for correcting the temperature characteristic of an electronic device.

2. Related Art

In general, physical quantity sensors have a reference value called zero point. The physical quantity is determined based on the zero point. The physical quantity sensors have a temperature characteristic, and the zero point varies with a variation in temperature. If the variation in the zero point is corrected, the physical quantity can be identified with high accuracy irrespective of the variation in temperature. The variation in zero point corresponding to the temperature is actually measured, and as a result, a correction value of the zero point corresponding to the temperature is set for each of the temperature values. JP-A-2011-255016 is an example of a related art document.

In the correction of the zero point, the relationship between a variation in parameter and the variation in the zero point is expressed by a computational formula. In general, a polynomial equation is used as the computational formula. However, the temperature characteristic of the zero point of the physical quantity sensor often has a peak value in a local temperature region, and the temperature characteristic of the zero point changes rapidly. In such a case, although the rapid change and the variation having a complicated shape are approximated by increasing the order of the polynomial equation, since the increase in the order slows the correction process, it is difficult to realize sufficient approximation within a realistic range of the order.

SUMMARY

An advantage according to at least one aspect of the invention is to provide a temperature characteristic correction device, a temperature characteristic correction formula determination method, an electronic apparatus, and a control circuit for realizing a correction of a temperature characteristic with accuracy higher than ever before.

(1) An aspect of the invention relates to a temperature characteristic correction device adapted to correct a temperature characteristic of an electronic device. The temperature characteristic correction device calculates a peak correction characteristic approximating a peak waveform having a peak value in a second range included in a first range of the temperature characteristic using a first formula, and a correction characteristic approximating a waveform continuing in the first range of the temperature characteristic using a second formula, calculates a total correction amount from the peak correction characteristic and the correction characteristic, and corrects the temperature characteristic using the total correction amount.

The first formula draws a curve having a peak value. Therefore, it is sufficient for the second formula to draw a gentle curve, and the accuracy of the approximation is improved using the combination of the first formula and the second formula. The temperature characteristic is corrected with accuracy higher than ever before. If the temperature characteristic is reproduced by only a polynomial in the entire area of the first range as in the related art, it is not achievable to sufficiently express the peak value, and it is not achievable to improve the accuracy of the approximation.

(2) The temperature characteristic correction device may receive a parameter signal for identifying temperature, calculate the total correction amount in accordance with the temperature, and correct the temperature characteristic. In such a manner, the temperature characteristic can be corrected in accordance with the temperature identified by the parameter signal.

(3) The first formula may be an exponential function. The exponential function can easily reproduce a peak waveform having a peak value.

(4) The second formula may be a polynomial. As described above, it is sufficient for the second formula to draw a gentle curve, and therefore, the waveform in the first range can accurately be reproduced outside the second range.

(5) In the temperature characteristic correction device, in a case in which a plurality of the peak waveforms exist in the first range, the peak correction characteristics may separately be set using the first formula in a descending order of a ratio of a height of the peak to a width of the peak. The higher the height of the peak to the width of the peak is, the steeper the slope of the curve becomes, and more sharply the peak waveform rises. As the slope of the curve decreases, it becomes possible to approximate the temperature characteristic by the second formula formed of the polynomial equation without using the first formula corresponding to the exponential function. Therefore, the computational formula is simplified.

(6) The temperature characteristic correction device may perform a filtering process on the temperature characteristic of the electronic device to separate the waveform continuing in the first range and the peak waveform from each other, and calculate the peak correction characteristic using the first formula based on the peak waveform separated. In such a manner, the peak correction characteristic can surely be calculated.

(7) The temperature characteristic correction device may be used in an electronic device. In this case, the electronic device can incorporate the temperature characteristic correction device.

(8) The electronic device may be used while being incorporated in an electronic apparatus. In this case, the electronic apparatus can include the electronic device.

(9) The electronic device may be used while being incorporated in a moving object. In this case, the moving object can include the electronic device.

(10) Another aspect of the invention relates to a temperature characteristic correction formula determination method including: changing temperature to identify a temperature characteristic of an electronic device, obtaining a peak correction characteristic by approximating a peak waveform having a peak value in a second range included in a first range of the temperature characteristic using a first formula, obtaining a correction characteristic by approximating a waveform continuing in the first range of the temperature characteristic using a second formula, and obtaining a computational formula for calculating a total correction amount from the peak correction characteristic and the correction characteristic.

(11) Still another aspect of the invention relates to a control circuit adapted to correct a temperature characteristic of an electronic device. The control circuit calculates a peak correction characteristic approximating a peak waveform having a peak value in a second range included in a first range of the temperature characteristic using a first formula, and a correction characteristic approximating a waveform continuing in the first range of the temperature characteristic using a second formula, calculates a total correction amount from the peak correction characteristic and the correction characteristic, and corrects the temperature characteristic using the total correction amount.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be explained with reference to the accompanying drawings. It should be noted that the present embodiment explained below does not unreasonably limit the content of the invention as set forth in the appended claims, and all of the constituents explained in the present embodiment are not necessarily essential as means for solving the problem according to the invention.

1. Configuration of Sensor Device

Figure 1:
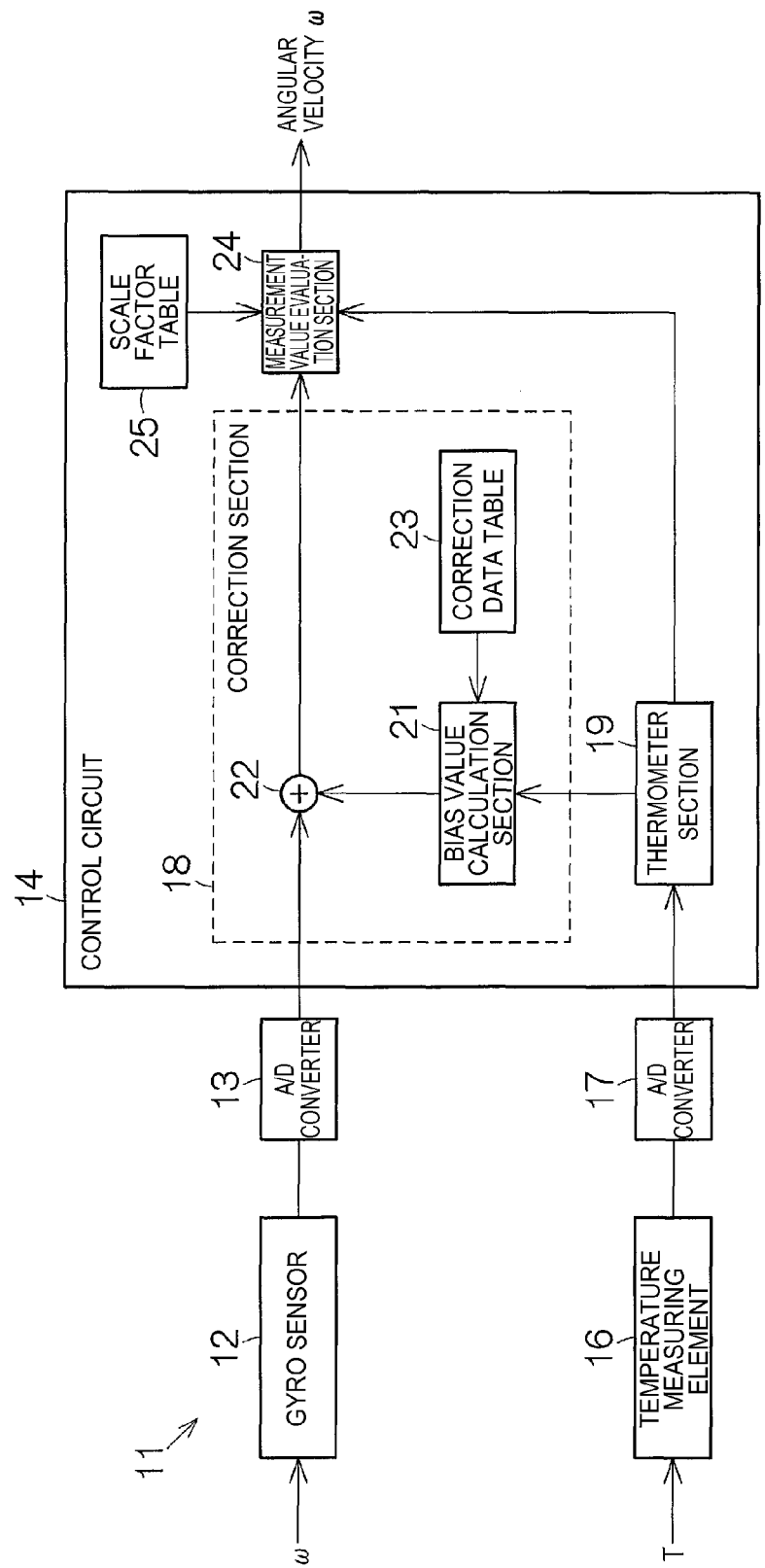
FIG. 1 is a block diagram schematically showing a configuration of a sensor device.

FIG. 1 schematically shows a configuration of a sensor device 11 as a specific example of an electronic device. The sensor device 11 is provided with a gyro sensor (a physical quantity sensor) 12. The gyro sensor 12 outputs an electric signal in accordance with an angular velocity ω (a physical quantity) acting on the gyro sensor 12. The electric signal is converted by an analog-digital converter 13 into a digital signal, and is then supplied to a control circuit 14.

The sensor device 11 is provided with a temperature measuring element 16. The temperature measuring element 16 outputs an electric signal in accordance with the ambient temperature T of the temperature measuring element 16. The electric signal is converted by an analog-digital converter 17 into a digital signal, and is then supplied to the control circuit 14.

The control circuit 14 is provided with a correction section 18 and a thermometer section 19. The correction section 18 is connected to the analog-digital converter 13. An output of the gyro sensor 12 is converted by the analog-digital converter 13 into a digital signal. The digital signal thus converted is supplied to the correction section 18. The thermometer section 19 is connected to the analog-digital converter 17. An output of the temperature measuring element 16 is converted by the analog-digital converter 17 into a digital signal. The digital signal thus converted is supplied to the thermometer section 19. The correction section 18 is supplied with a parameter signal from the thermometer section 19. The parameter signal specifies a parameter value. Here, the parameter value corresponds to the temperature. The temperature is converted into a numerical value by the thermometer section 19 based on the output of the temperature measuring element 16. The correction section 18 calculates a total correction amount in accordance with the temperature to correct the temperature characteristic.

The correction section 18 is provided with a bias value calculation section 21, an adder 22, and a correction data table 23. The bias value calculation section 21 is connected to the thermometer section 19. The bias value calculation section 21 calculates a zero-point correction value, namely a bias value, in accordance with a prescribed computational formula. In calculating the bias value, the bias value calculation section 21 refers to a function coefficient stored in the correction data table 23. As a result, the zero-point correction value is calculated in the bias value calculation section 21 in accordance with the parameter value. The zero-point correction value thus calculated is added to an output of the gyro sensor 12 by the adder 22. In such a manner as described above, the electric signal is corrected in accordance with the temperature measured.

A measurement value evaluation section 24 is connected to the adder 22. The measurement value evaluation section 24 outputs a measurement value based on the electric signal thus corrected. A scale factor table 25 is connected to the measurement value evaluation section 24. The measurement value as a digital value is stored in the scale factor table 25 in accordance with the measurement value of the electric signal. The measurement value evaluation section 24 reads out the corresponding measurement value from the scale factor table 25 in accordance with the electric signal thus measured. The measurement value read out in such a manner is output from the control circuit 14. The measurement value of the angular velocity is output with high accuracy in accordance with the zero-point correction.

The bias value calculation section 21 uses a computational formula in calculating the zero-point correction value. In the computational formula, the zero-point correction value is specified in accordance with the temperature. The computational formula is formed of a superposition of the first formula, which is an exponential function for specifying a waveform (thereinafter referred to as a "peak waveform") having a single peak value in a second range included in a first range and narrower than the first range, and a second formula, which is a polynomial equation for specifying a waveform continuing throughout the entire area of the first range. The first formula forms a peak correction characteristic for approximating the peak waveform. The second formula forms a correction characteristic for approximating the waveform continuing in the first range. The bias value calculation section 21 calculates the total correction amount from the peak correction characteristic and the correction characteristic. Here, the following formula is provided as the computational formula.

$$E_{(T)} = \sum_{n=1}^{m} D_{n(T_{0n}, w_n, h_n, \rho_n)} + \sum_{k=0}^{l} a_k T^k = \sum_{n=1}^{m} h_n \cdot 2^{-\left(\frac{|T-T_{0n}|}{w_n}\right)^{\rho_n}} + \sum_{k=0}^{l} a_k T^k$$ Formula 1

Figure 2:
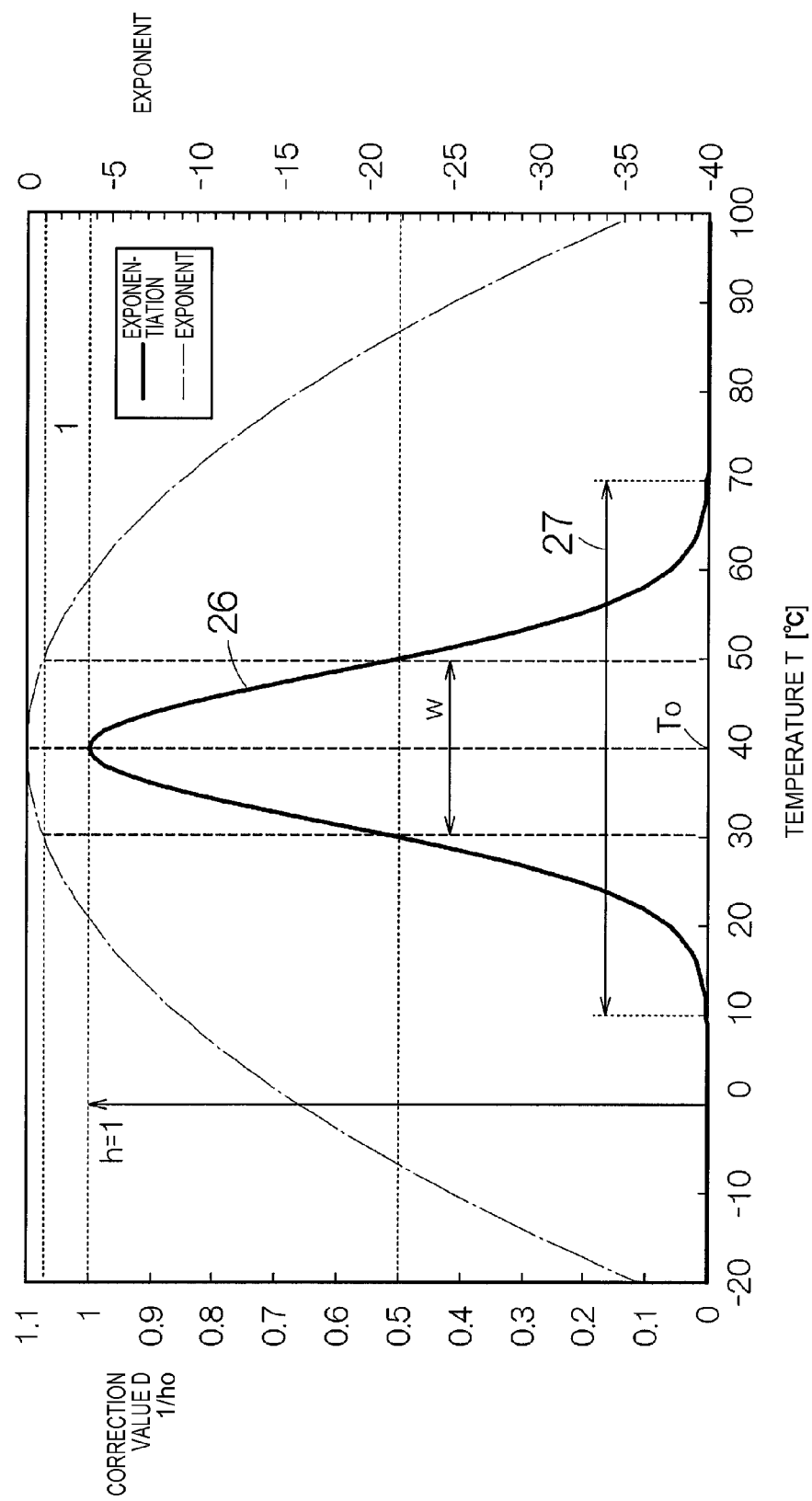
FIG. 2 is a graph schematically showing a peak waveform related to a first formula.

The first term of the computational formula corresponds to the first formula. The second term corresponds to the second formula. As shown in FIG. 2, according to the first formula, a peak waveform 26 of the correction value D is a function of the temperature T, draws shapes similar to each other respectively on a higher temperature side and a lower temperature side of the center temperature $T_0$, and shows a peak value (the height of the peak waveform 26) $h_0$ at the center temperature $T_0$. Here, since the base is set to "2," the width w of the peak waveform 26 is defined at a height equal to a half of the height $h_0$. The shape of the peak waveform 26 varies in accordance with a coefficient $\rho$ (>0). The symbol n represents a natural number, and the symbol k represents an integer equal to or greater than zero. Since the peak waveform 26 shows a zero value "0" outside the second range 27, the peak waveform 26 does not affect the curve of the second formula outside the second range 27.

2. Specific Example of Temperature Characteristic

Figure 3:
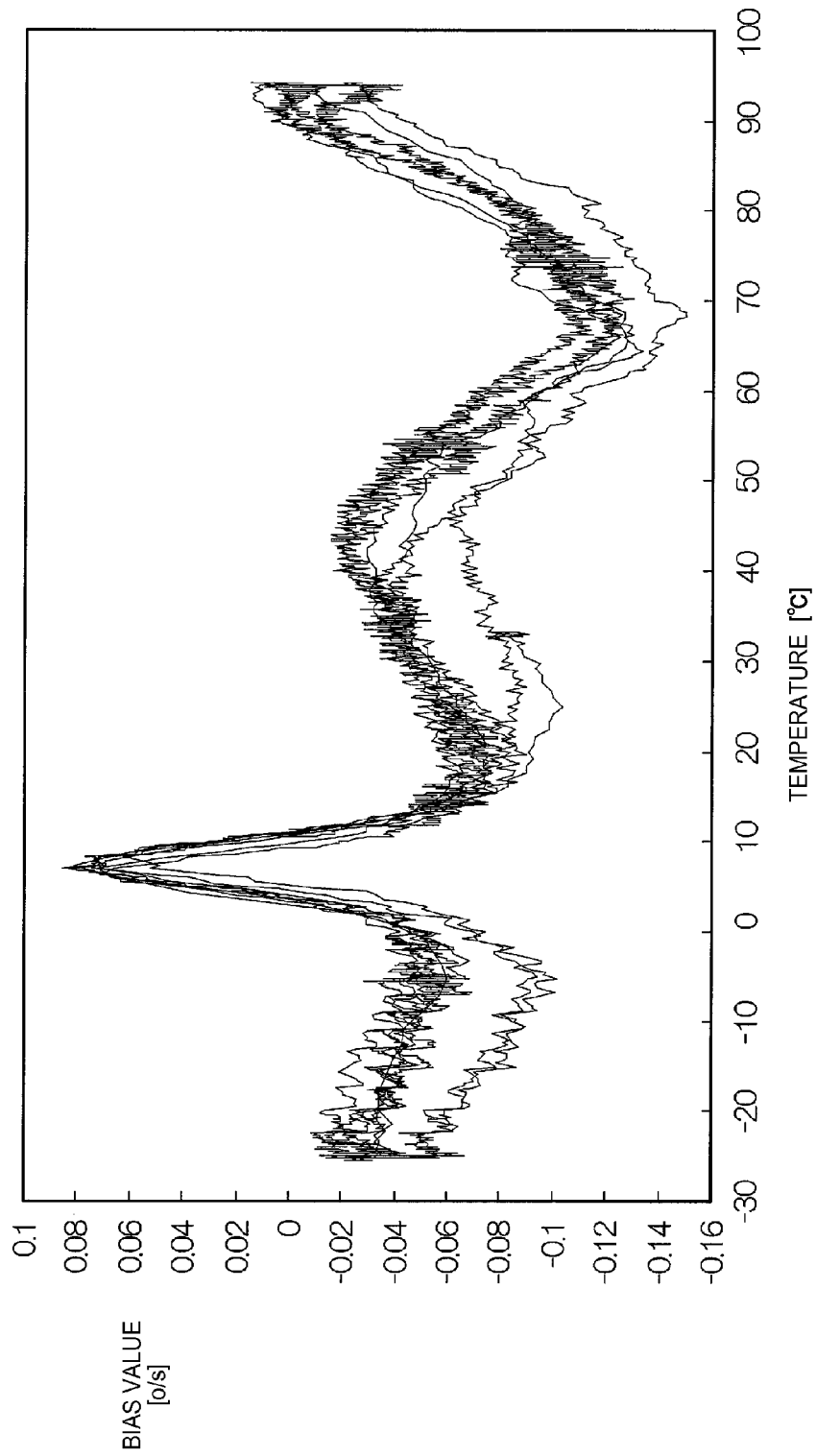
FIG. 3 is a graph showing a temperature characteristic of a zero point related to a specific example.
Figure 4:
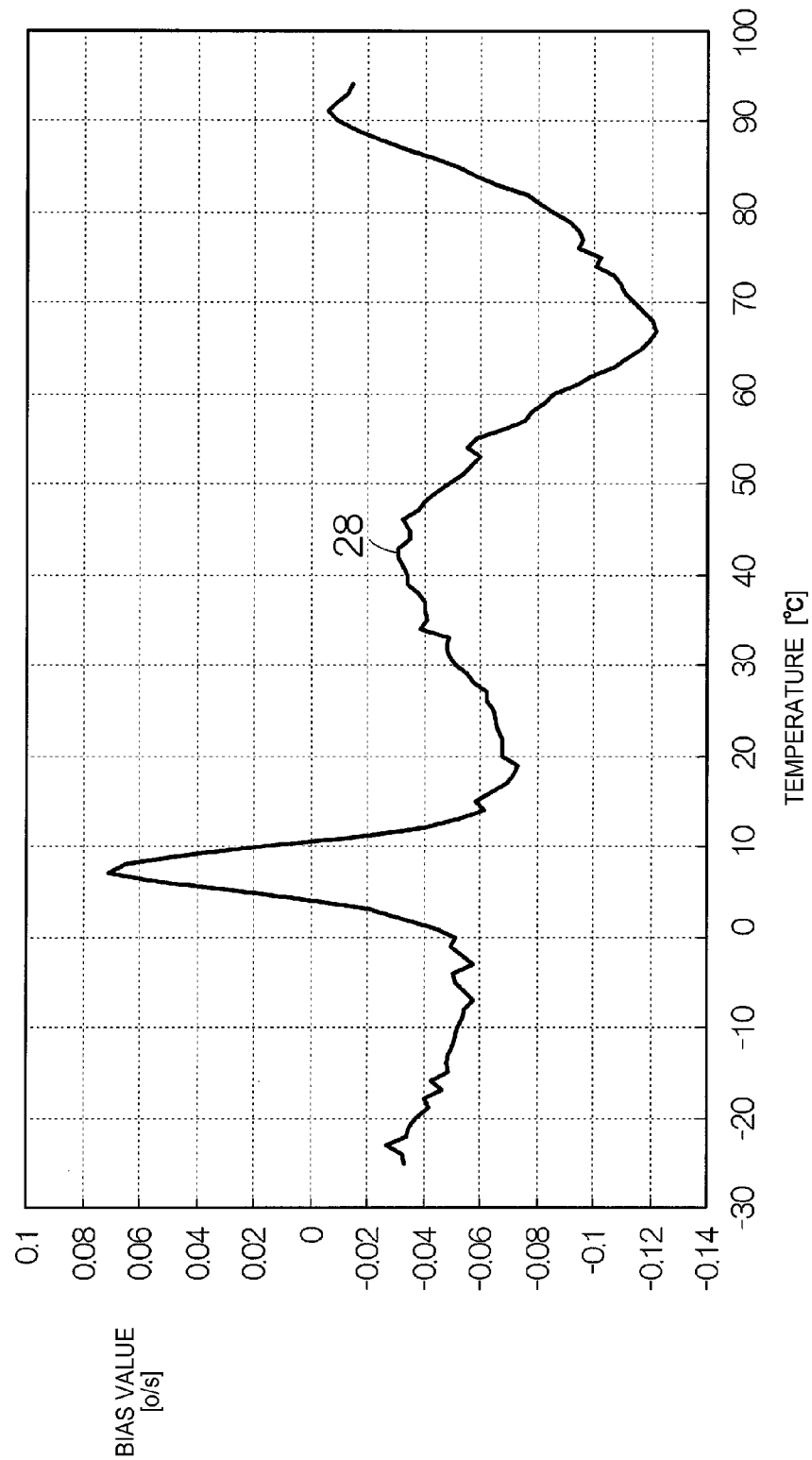
FIG. 4 is a graph showing a simplified temperature characteristic.

FIG. 3 shows a temperature characteristic of the zero point related to a specific example. In specifying the computational formula, the waveform 28 of the temperature characteristic is simplified as shown in FIG. 4. Here, the following formula is set to the first formula. In other words, $\rho=2$ is set in the exponential term. Therefore, even if the absolute value is removed from Formula 1 in the scale of a temperature difference, the exponential term is kept to a negative value.

$$D_{(T_0, w, h)} = h_0 \cdot 2^{-\left(\frac{T-T_0}{w}\right)^2}$$ Formula 2

As shown in the following formula, in setting the total correction amount E(T), a polynomial including four terms is set in the second formula.

$$E_{(T)} = \sum_{n=1} D_{n(T, w, h)} + (aT^3 + bT^2 + cT + d)$$ Formula 3

Figure 5:
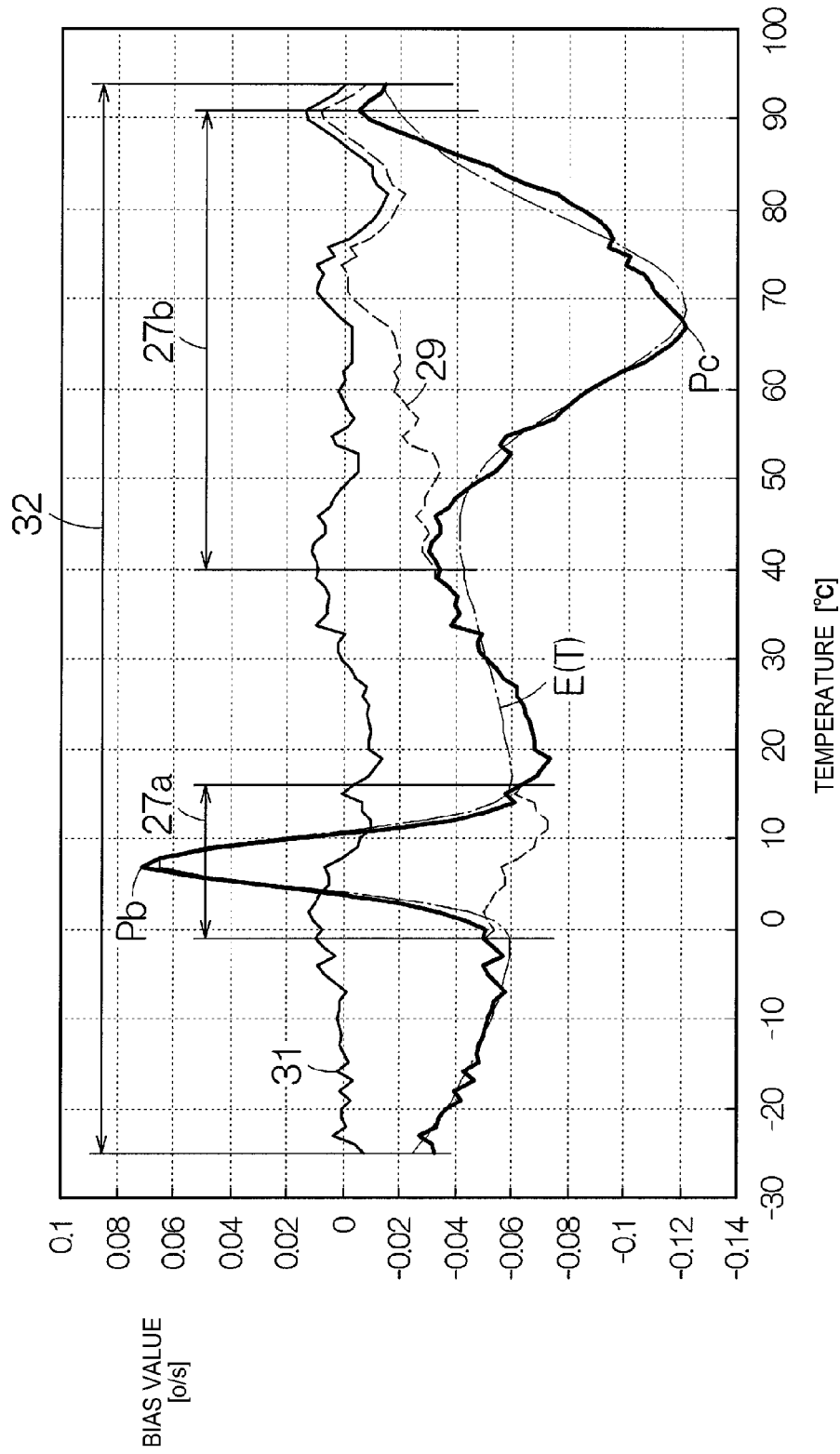
FIG. 5 is a graph schematically showing a process of a correction of the temperature characteristic.

In the waveform 28 of the temperature characteristic, there are specified two peak values Pb, Pc. As shown in FIG. 5, the first peak value Pb has the center temperature $T_0$ at, for example, 7.5 degrees Celsius. The width W=3.2 degrees and the height $H_0$=0.13°/s are set in the first formula. The second peak value Pc has the center temperature $T_0$ at 70 degrees Celsius. The width W=12 degrees and the height $H_0$=−0.11°/s are set in the first formula. In such a manner, the waveform 28 of the temperature characteristic is corrected in the two second ranges 27a, 27b. As a result, the peak values Pb, Pc are corrected, and thus, a first formula correction curve 29 can be obtained.

The second formula is set with respect to the first formula correction curve 29 obtained in such a manner. The second formula approximates the first formula correction curve 29. The value of −2.39×10$^{-7}$ is set to the coefficient a, the value of 3.343×10$^5$ is set to the coefficient b, the value of −4.56×10$^{-4}$ is set to the coefficient c, and the value of −6.1349×10$^{-2}$ is set to the coefficient d. In such a manner, the total correction amount E(T) is determined based on the superposition of the first formula and the second formula. If the temperature characteristic of the zero point is corrected with the total correction amount E(T), a correction value waveform 31 of the corrected temperature characteristic can be obtained. It is confirmed that the shift of the zero point falls within a range of ±0.2°/s throughout the entire area of the first range 32.

Figure 6:
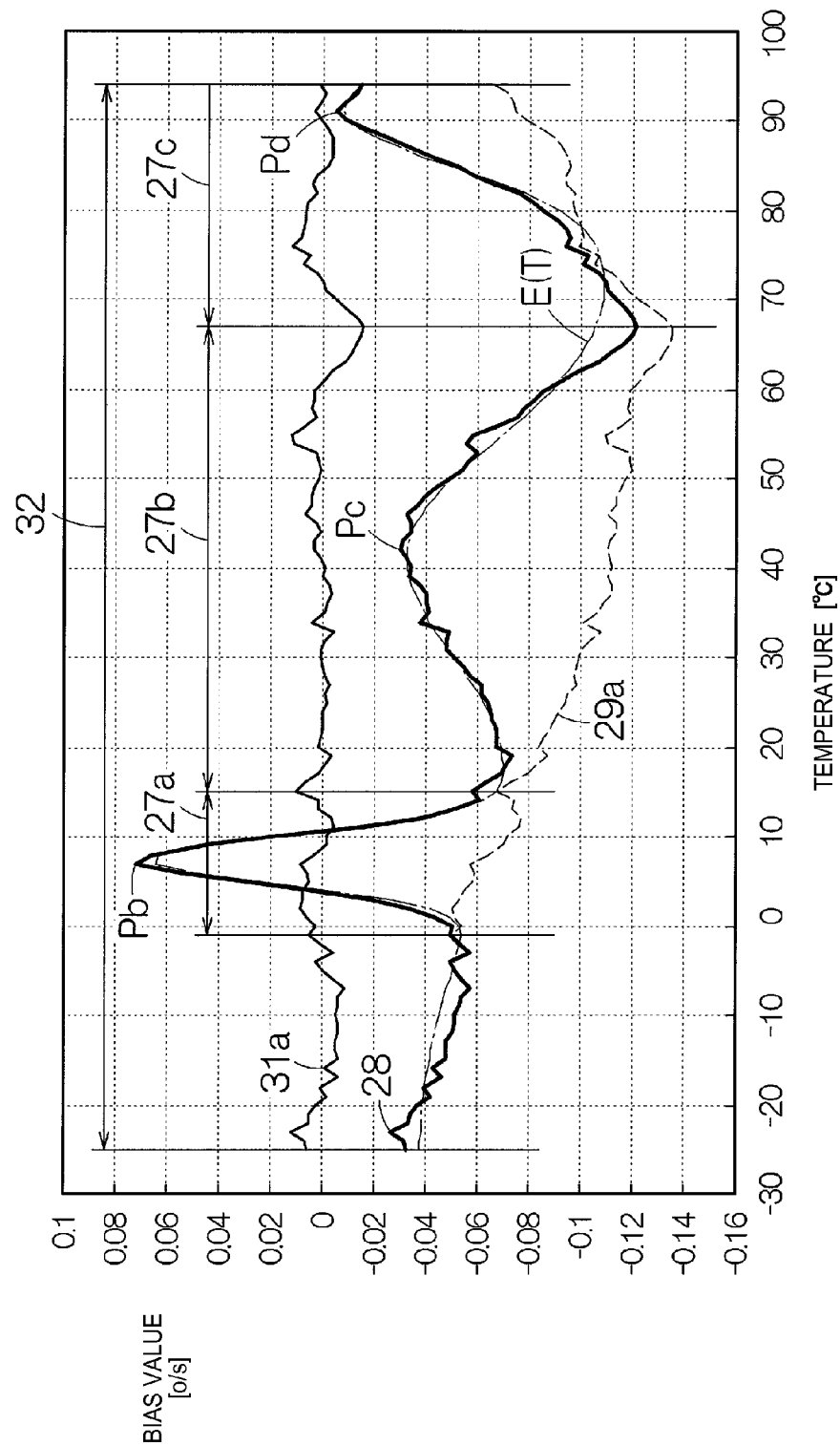
FIG. 6 is a graph schematically showing a process of a correction according to another embodiment of the invention.

It is also possible that three peak values Pb, Pc, and Pd are specified in the waveform of the temperature characteristic. As shown in FIG. 6, the first peak value Pb has the center temperature $T_0$ at, for example, 7.5 degrees Celsius. The width W=3.2 degrees and the height $H_0$=0.13°/s are set in the first formula. The second peak value Pc has the center temperature $T_0$ at 43 degrees Celsius. The width W=15 degrees and the height $H_0$=0.08°/s are set in the first formula. The third peak value Pd has the center temperature $T_0$ at 90 degrees Celsius. The width W=6 degrees and the height $H_0$=0.07°/s are set in the first formula. In such a manner, the waveform 28 of the temperature characteristic is corrected in the three second ranges 27a, 27b, and 27c. As a result, the peak values Pb, Pc, and Pd are corrected, and thus, a first formula correction curve 29a can be obtained.

Figure 7:
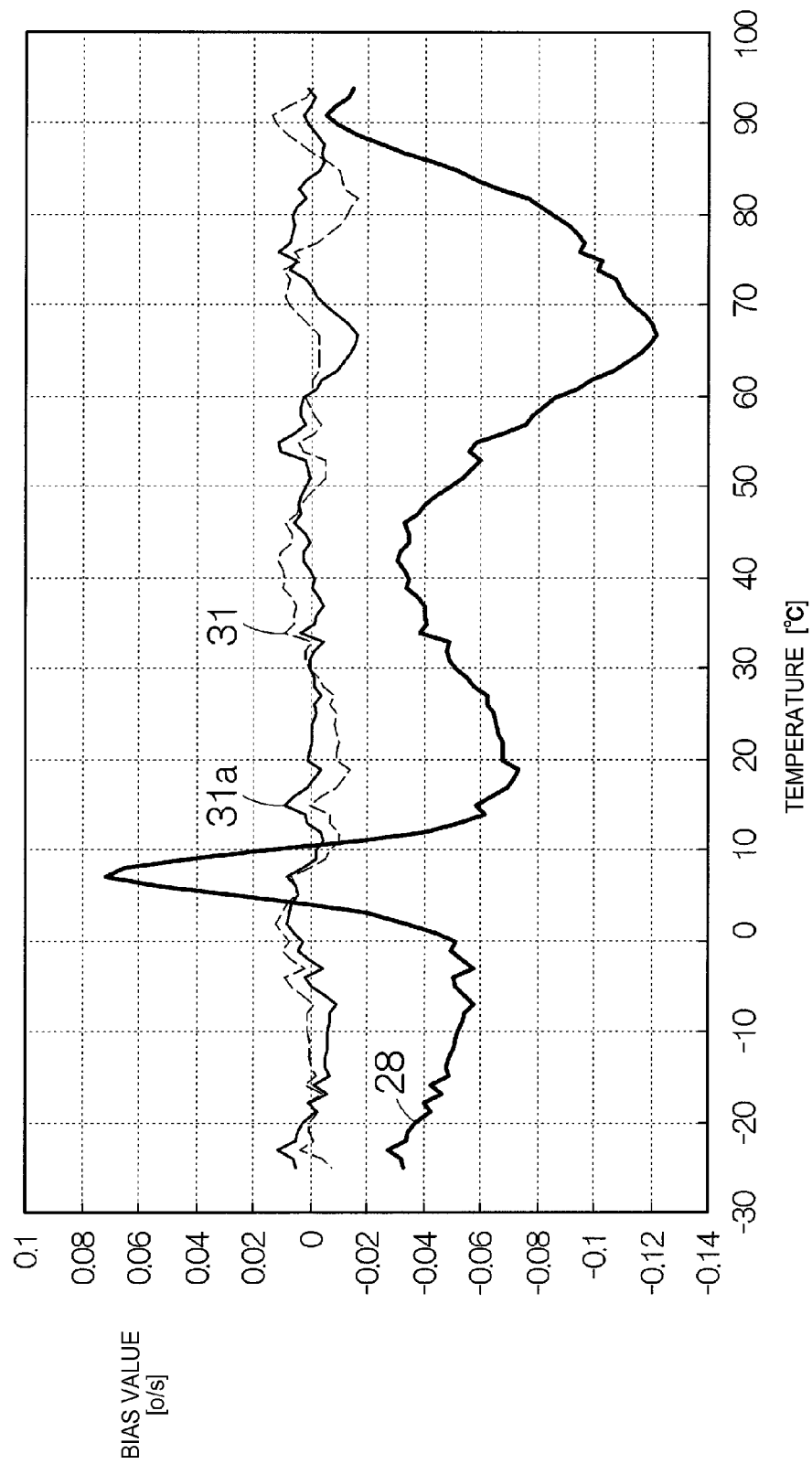
FIG. 7 is a graph showing a comparison between two correction value waveforms.

The second formula is set with respect to the first formula correction curve 29a obtained in such a manner. The second formula approximates the first formula correction curve 29a. The value of $-2.39 \times 10^{-7}$ is set to the coefficient a, the value of $3.343 \times 10^5$ is set to the coefficient b, the value of $-4.56 \times 10^{-4}$ is set to the coefficient c, and the value of $-6.1349 \times 10^{-2}$ is set to the coefficient d. In such a manner, the total correction amount E(T) is determined based on the superposition of the first formula and the second formula. If the temperature characteristic of the zero point is corrected with the total correction amount E(T), a correction value waveform 31a of the corrected temperature characteristic can be obtained. It is confirmed that the shift of the zero point falls within a range of ±0.2°/s throughout the entire area of the first range 32. For example, as shown in FIG. 7, as is obvious from the two correction value waveforms 31, 31a, it is confirmed that if the first formula increases, the shift of the zero point converges in a narrower range.

Figure 8:
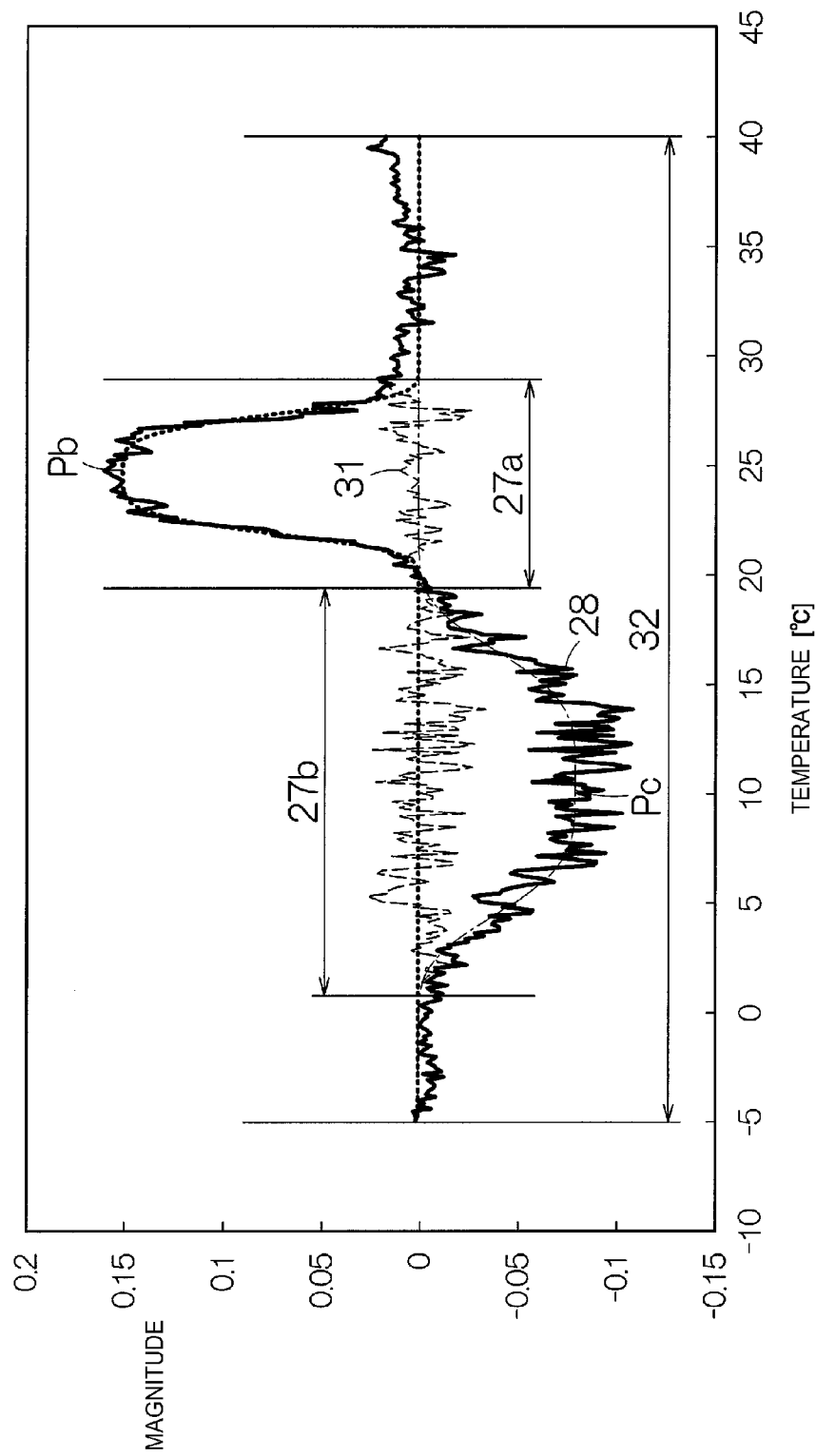
FIG. 8 is a graph showing a temperature characteristic of a zero point related to another specific example.

FIG. 8 shows a temperature characteristic of the zero point related to another specific example. The correction amount is calculated with the following formula.

$$E_{(T)} = \sum_{n=1}^{2} h_n \cdot 2^{-\left(\frac{|T-T_{0n}|}{w_n}\right)^{\rho_n}} =$$
$$0.15 \times 2^{-\left(\frac{|T-24.6|}{2.7}\right)^{4.5}} + 0.08 \times 2^{-\left(\frac{|T-10.5|}{6}\right)^{3.9}}$$

Formula 4

It is confirmed that although the second formula of the polynomial equation is omitted in calculating the correction amount, the zero point is sufficiently corrected.

Figure 9:
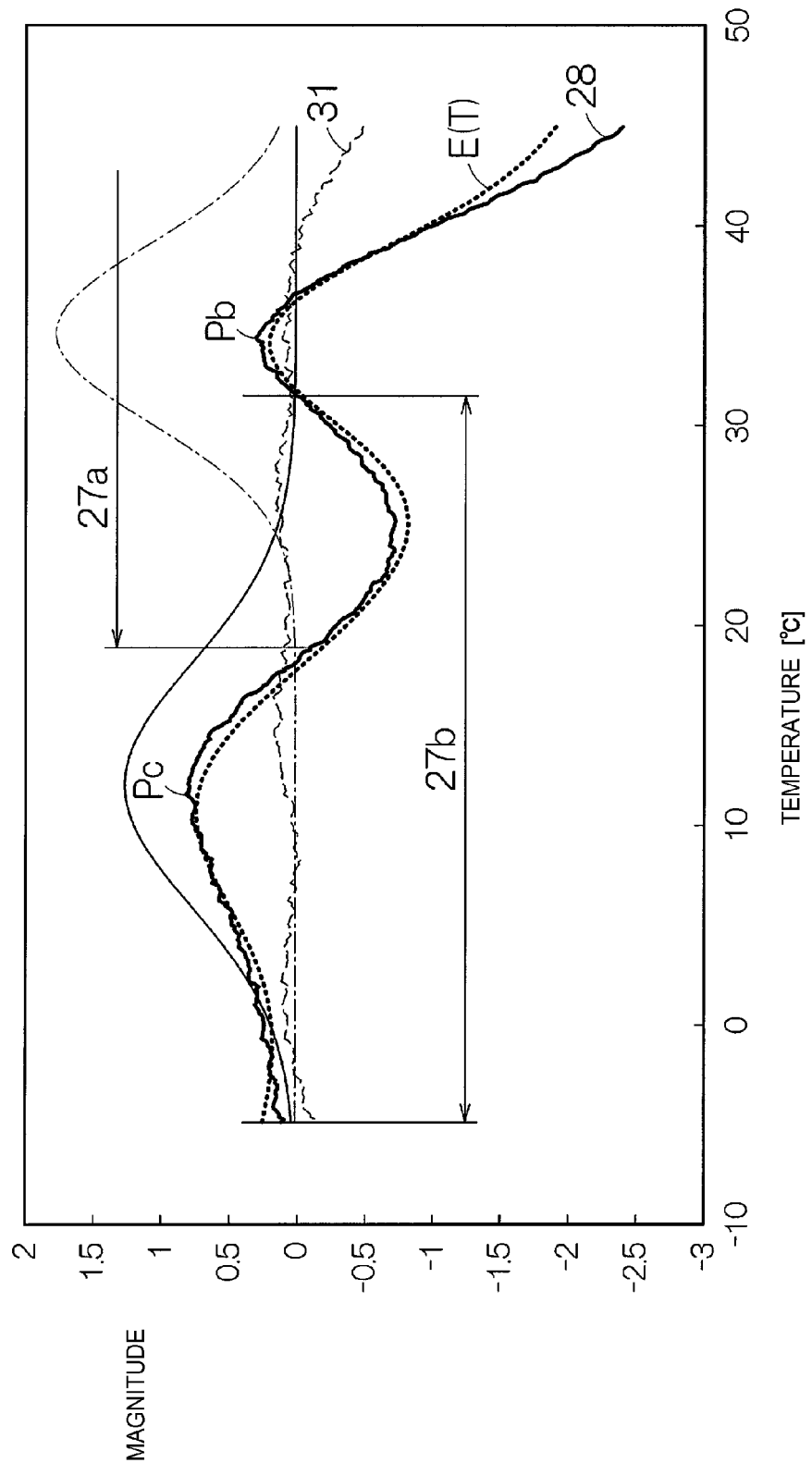
FIG. 9 is a graph showing a temperature characteristic of a zero point related to still another specific example.

FIG. 9 shows a temperature characteristic of the zero point related to still another specific example. The correction amount is calculated with the following formula.

$$E_{(T)} = \sum_{n=1}^{2} h_n \cdot 2^{-\left(\frac{|T-T_{0n}|}{w_n}\right)^{\rho_n}} + \sum_{k=0}^{m} a_k T^k$$
$$= 1.76 \times 2^{-\left(\frac{|T-34.6|}{5.3}\right)^{2}} + 1.25 \times 2^{-\left(\frac{|T-12|}{7.2}\right)^{2}} - 1.853 \times$$
$$10^{-5} T^3 + 6.64 \times 10^{-4} T^2 - 4.543 \times 10^{-2} T - 8.239 \times 10^{-3}$$

Formula 5

Figure 10:
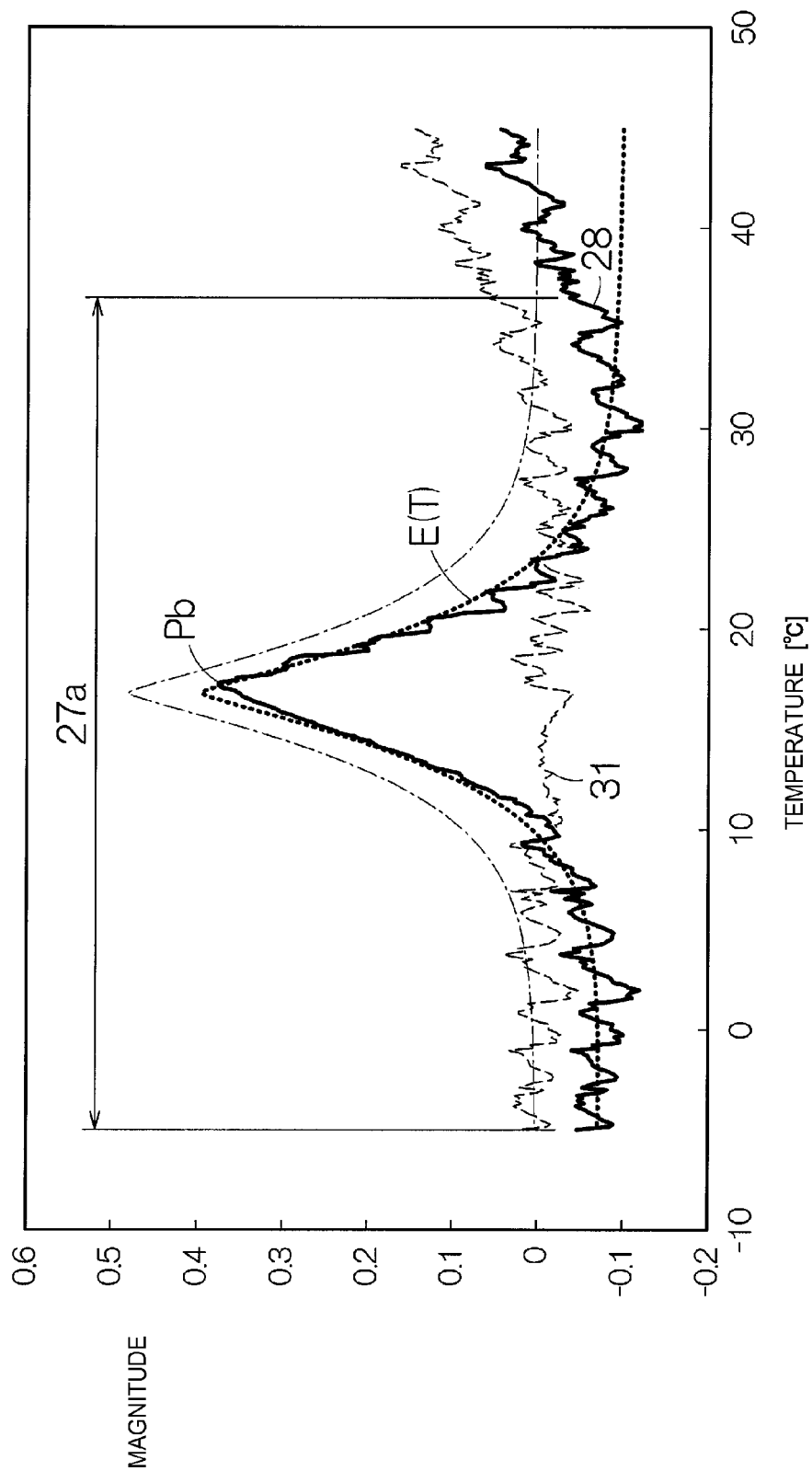
FIG. 10 is a graph showing a temperature characteristic of a zero point related to still another specific example.

Similarly, FIG. 10 shows a temperature characteristic of the zero point related to still another specific example. The correction amount is calculated with the following formula.

$$E_{(T)} = \sum_{n=1}^{1} h_n \cdot 2^{-\left(\frac{|T-T_{0n}|}{w_n}\right)^{\rho_n}} + \sum_{k=0}^{3} a_k T^k$$
$$= 0.48 \times 2^{-\left(\frac{|T-16.8|}{3.2}\right)^{1.2}} + 5.15706 \times 10^{-6} T^3 - 1.55824 \times$$
$$10^{-4} T^2 - 5.54553 \times 10^{-4} T - 7.62397 \times 10^{-2}$$

Formula 6

3. Comparison of Approximation Formulas

Figure 11:
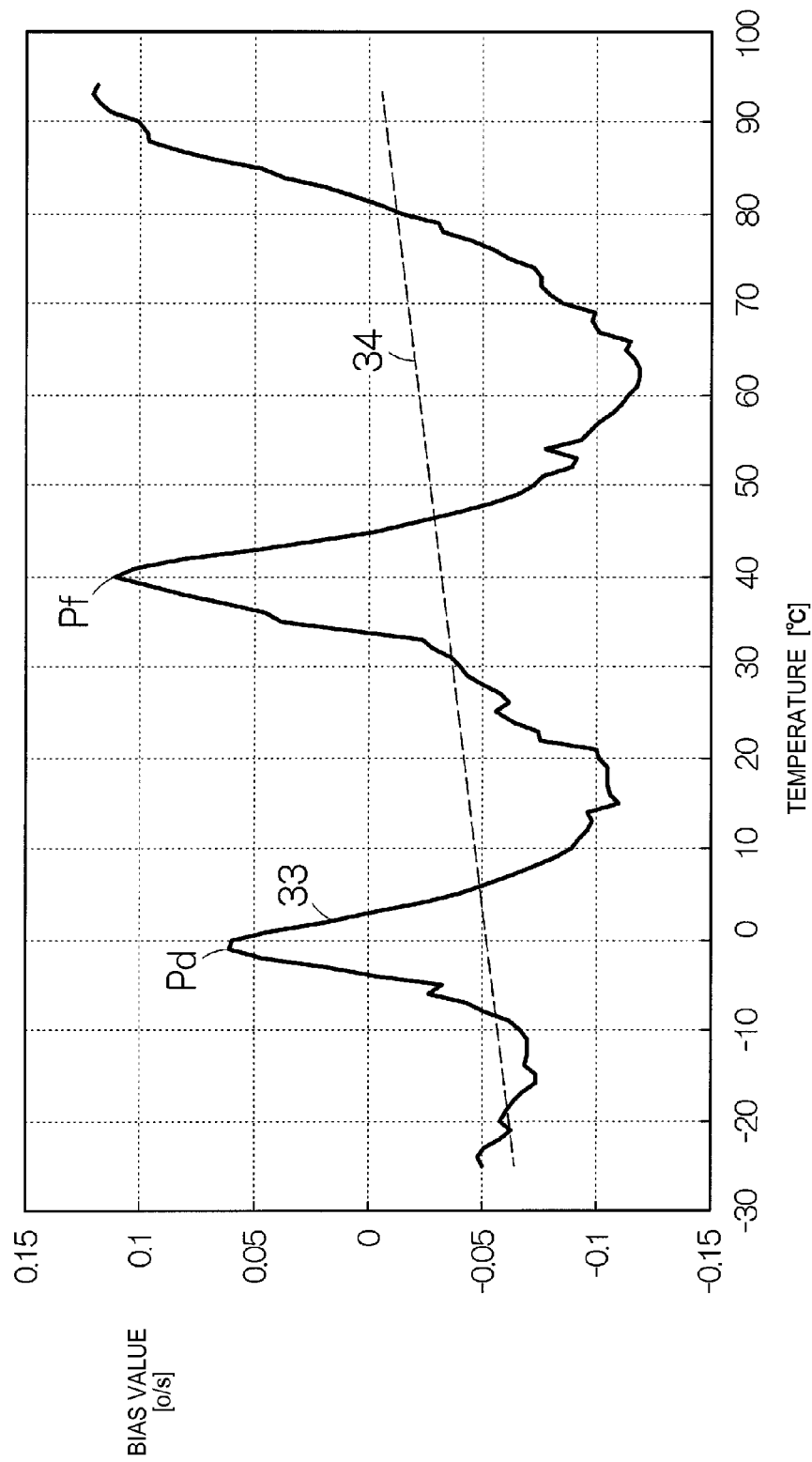
FIG. 11 is a graph showing the case in which a waveform of a variation characteristic is approximated by a first-order polynomial equation.

In FIGS. 11 through 16, there is drawn the case in which a waveform 33 of an arbitrary variation characteristic is approximated only by a polynomial equation (corresponding to the second formula of the computational formula described above). FIG. 11 shows the case of the approximation by a first-order polynomial equation such as the following formula.

$$y=ax+b$$

Formula 7

Figure 12:
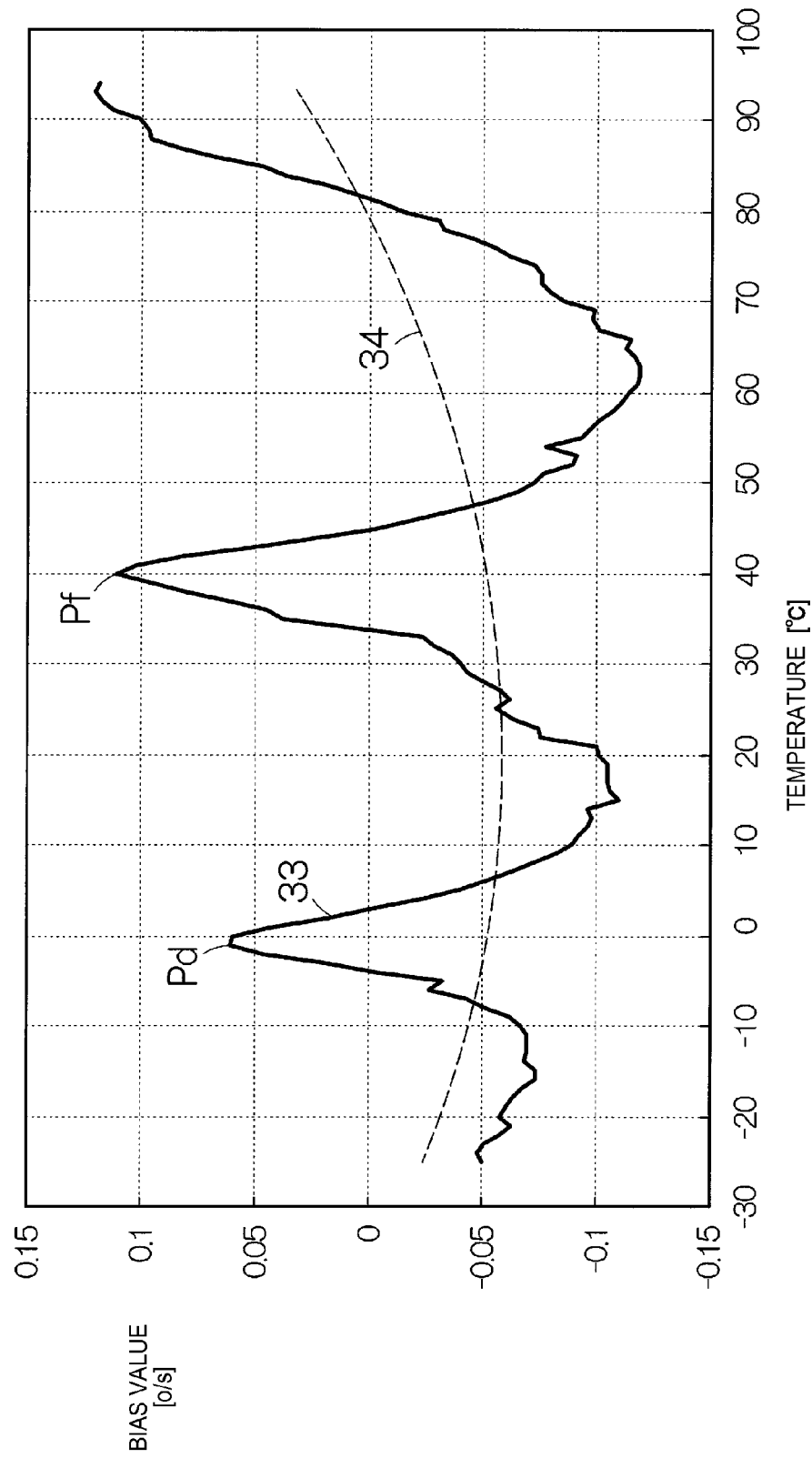
FIG. 12 is a graph showing the case in which the waveform of the variation characteristic is approximated by a second-order polynomial equation.

FIG. 12 shows the case of the approximation by a second-order polynomial equation such as the following formula.

$$y=ax^2+bx+c$$

Formula 8

Figure 13:
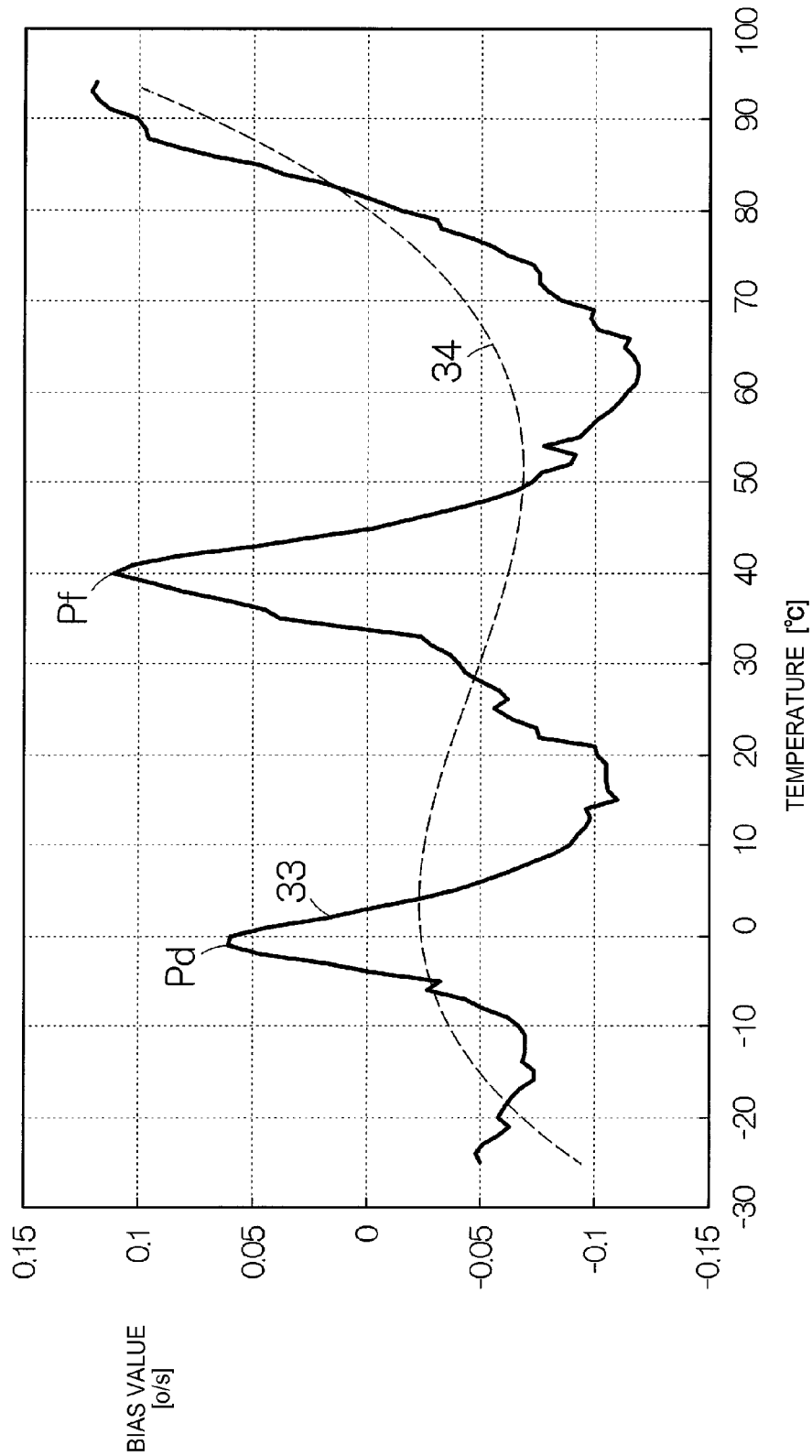
FIG. 13 is a graph showing the case in which the waveform of the variation characteristic is approximated by a third-order polynomial equation.

FIG. 13 shows the case of the approximation by a third-order polynomial equation such as the following formula.

$$y=ax^3+bx^2+cx+d$$

Formula 9

Figure 14:
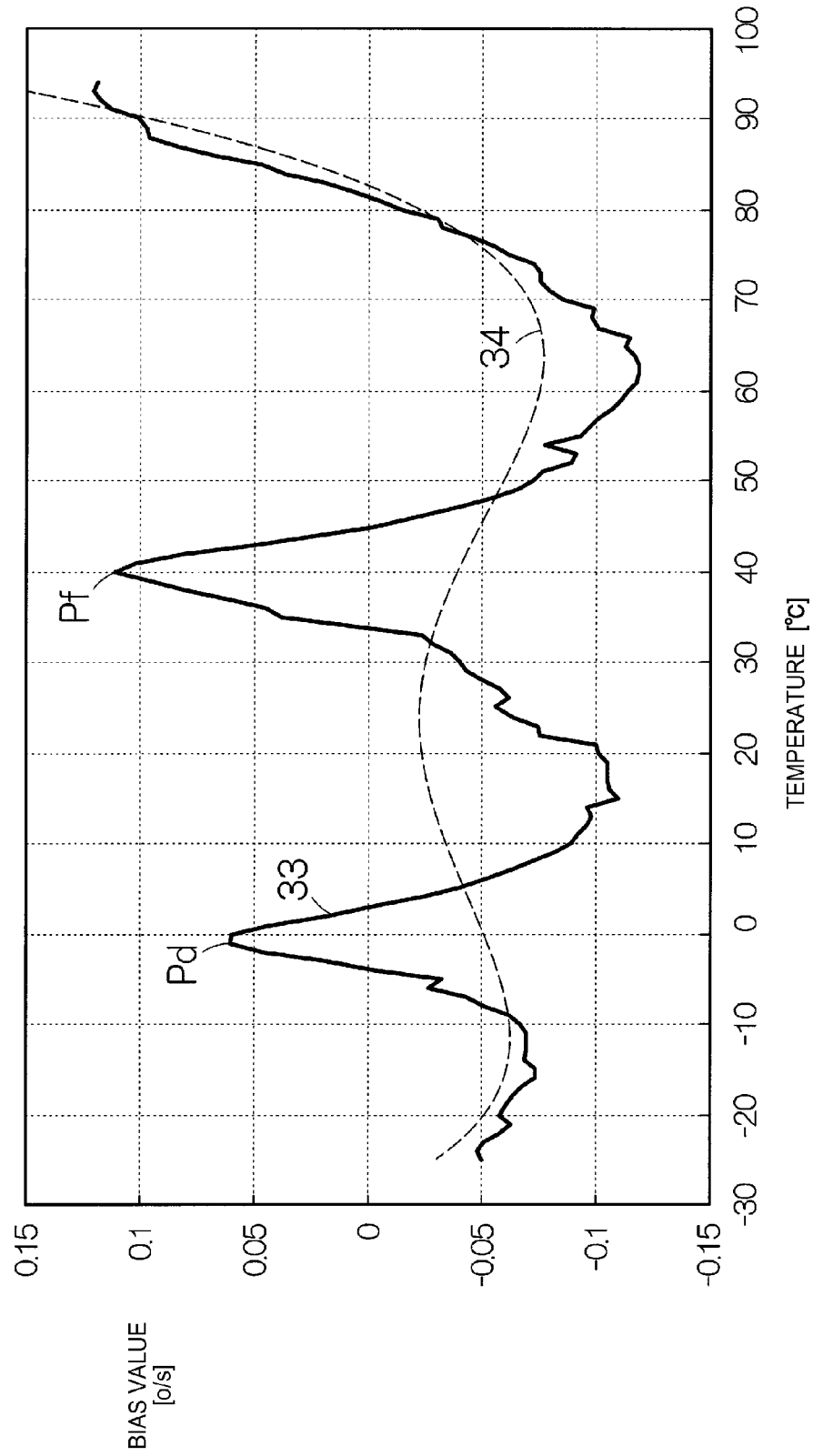
FIG. 14 is a graph showing the case in which the waveform of the variation characteristic is approximated by a fourth-order polynomial equation.

FIG. 14 shows the case of the approximation by a fourth-order polynomial equation such as the following formula.

$$y=ax^4+bx^3+cx^2+dx+e$$

Formula 10

Figure 15:
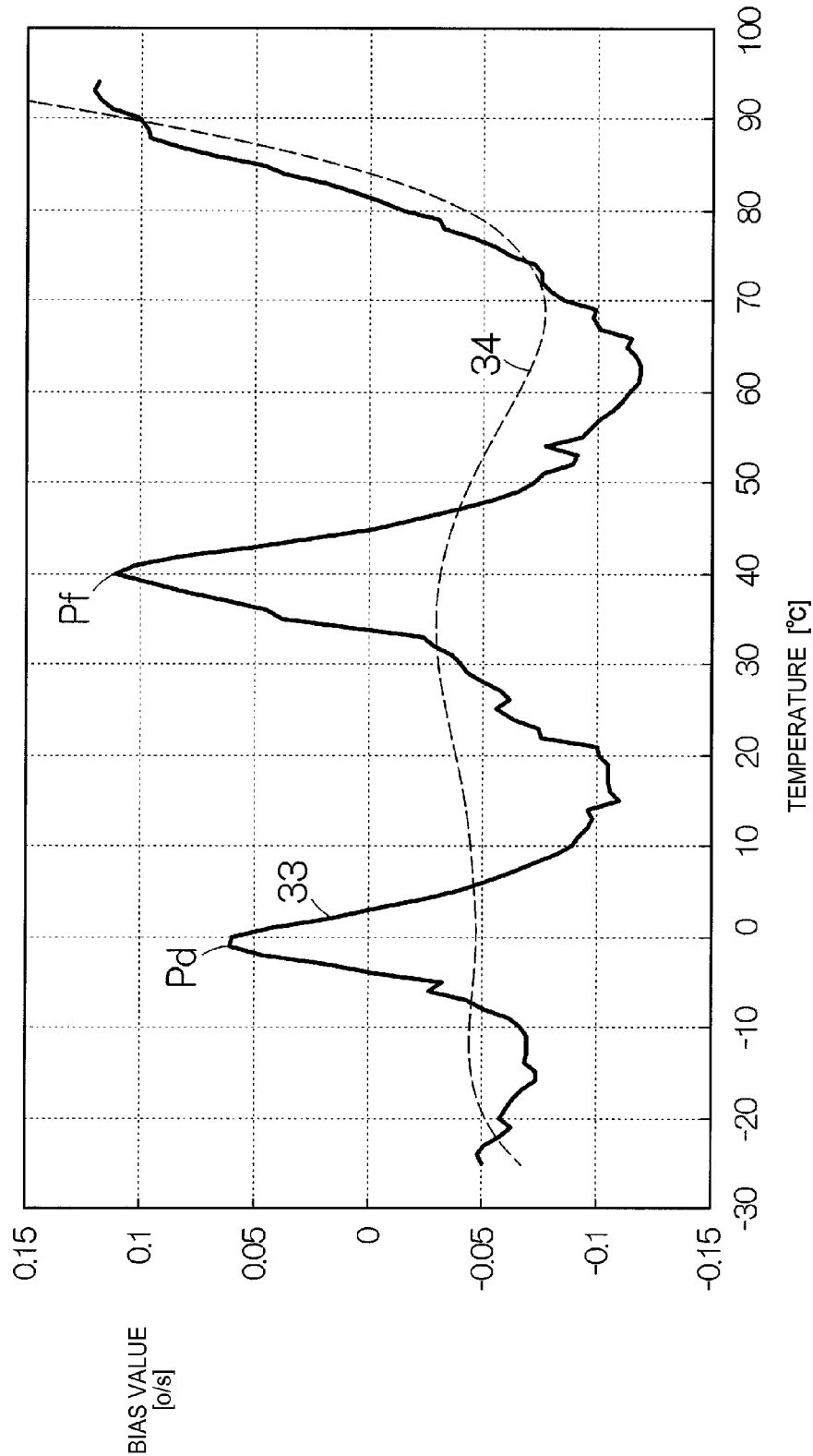
FIG. 15 is a graph showing the case in which the waveform of the variation characteristic is approximated by a fifth-order polynomial equation.

FIG. 15 shows the case of the approximation by a fifth-order polynomial equation such as the following formula.

$$y=ax^5+bx^4+cx^3+dx^2+ex+f$$

Formula 11

Figure 16:
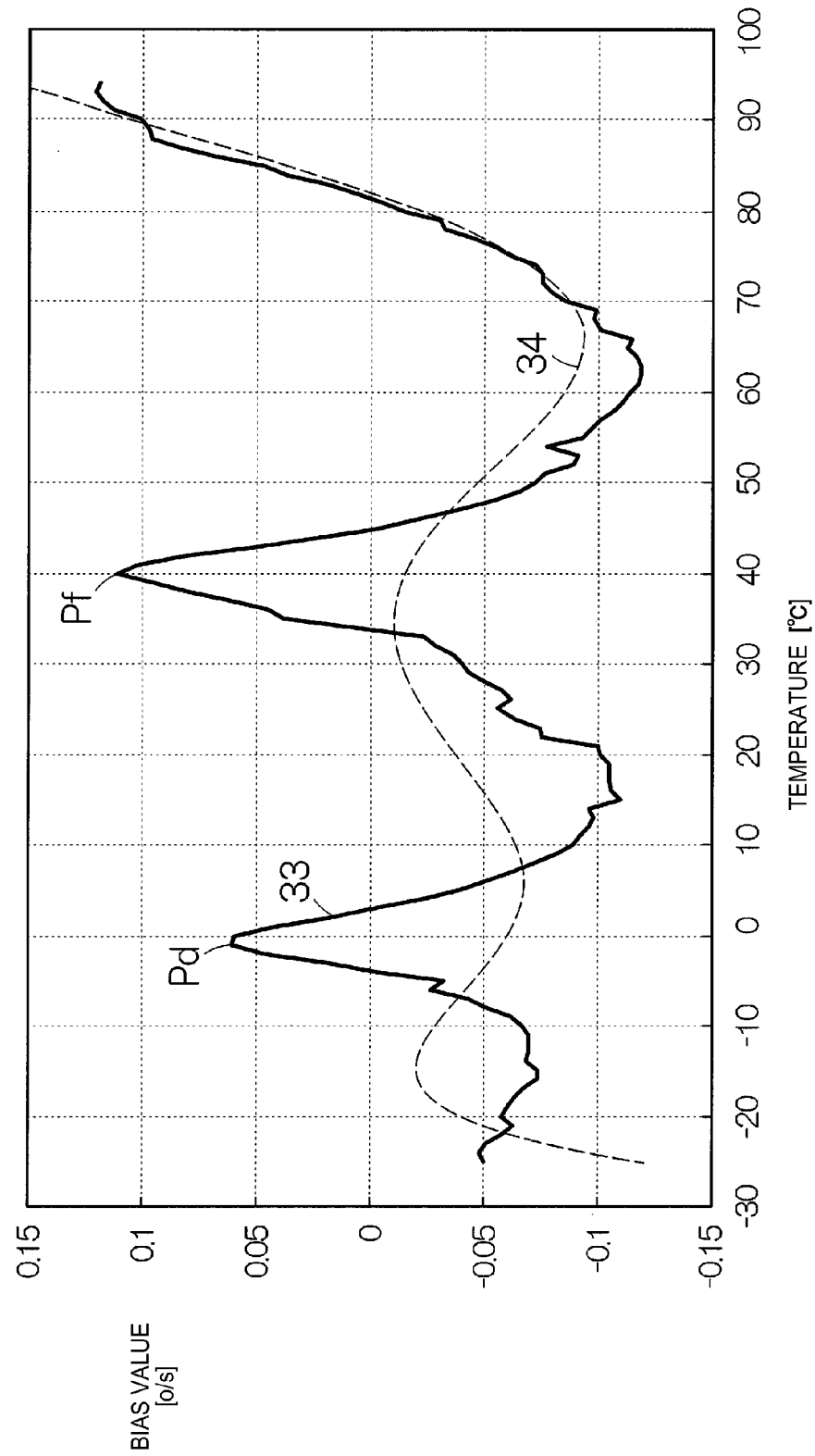
FIG. 16 is a graph showing the case in which the waveform of the variation characteristic is approximated by a sixth-order polynomial equation.

FIG. 16 shows the case of the approximation by a sixth-order polynomial equation such as the following formula.

$$y=ax^6+bx^5+cx^4+dx^3+ex^2+fx+g$$

Formula 12

It is understood that as the order of the polynomial equation increases, the approximate waveform 34 gradually becomes more similar to the original waveform 33. It is also understood that on the other hand, the waveform of the polynomial equation does not sufficiently approximate to the original waveform 33 in the second ranges respectively including the peak values Pd, Pf. Moreover, it is easily expected that the error increases outside the range in which the approximation by the polynomial equation is performed, namely the first range.

Figure 17:
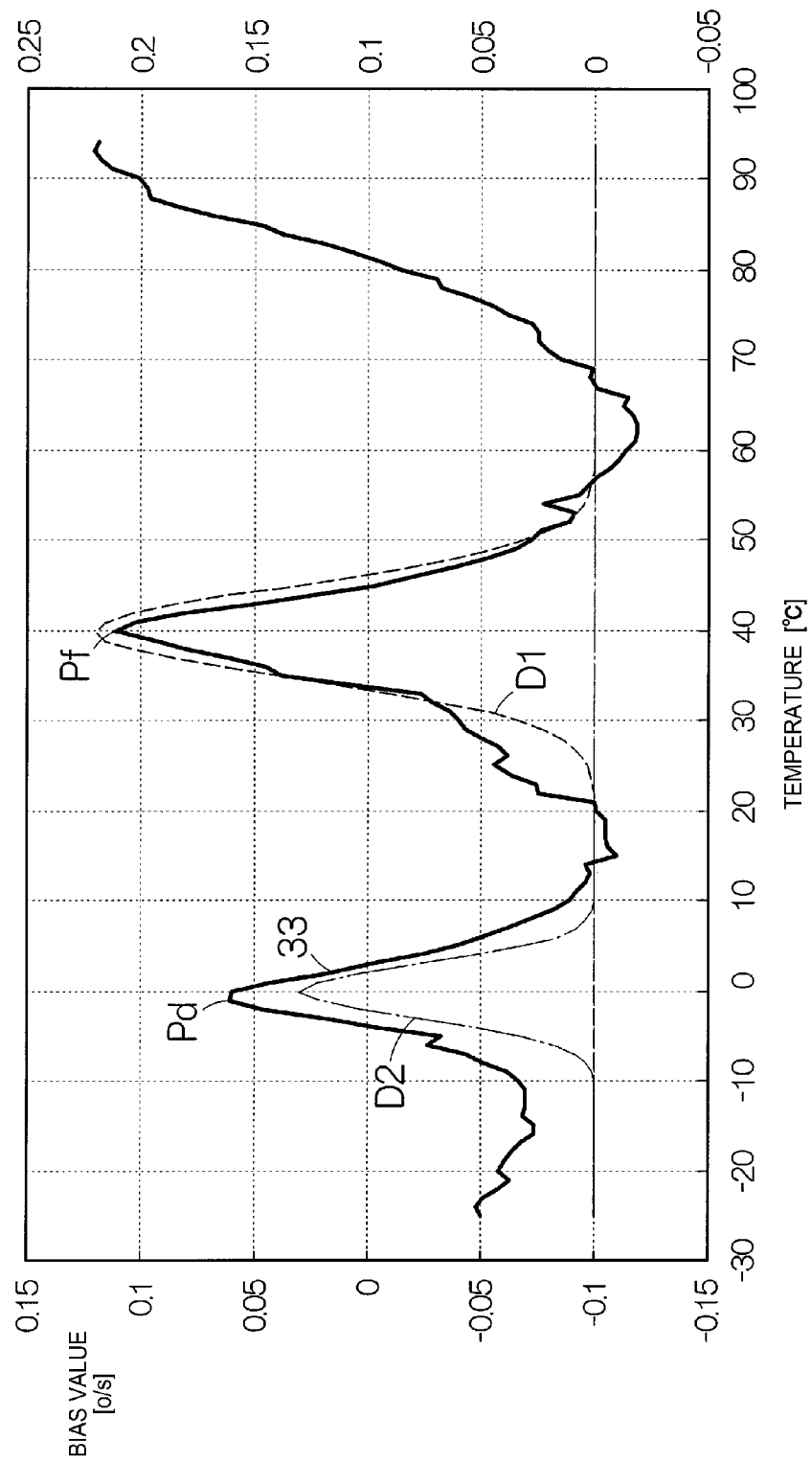
FIG. 17 is a graph showing the case in which two second ranges are approximated by the first formula in the waveform of the variation characteristic.

In FIG. 17, there is drawn the case in which the two second ranges of the waveform 33 of the variation characteristic described above are approximated by the first formulas D1, D2 (Formula 2 described above). The approximation by a third-order polynomial equation is performed on the waveform of the variation characteristic obtained by subtracting the respective approximate curves. In the approximation by the third-order polynomial equation, the method of least squares is used. The approximation corresponds to the following formula.

$$E_{(T)} = h_1 \cdot 2^{-\left(\frac{T-T_1}{w_1}\right)^2} + h_2 \cdot 2^{-\left(\frac{T-T_2}{w_2}\right)^2} + (aT^3 + bT^2 + cT + d) \quad \text{Formula 13}$$

Figure 18:
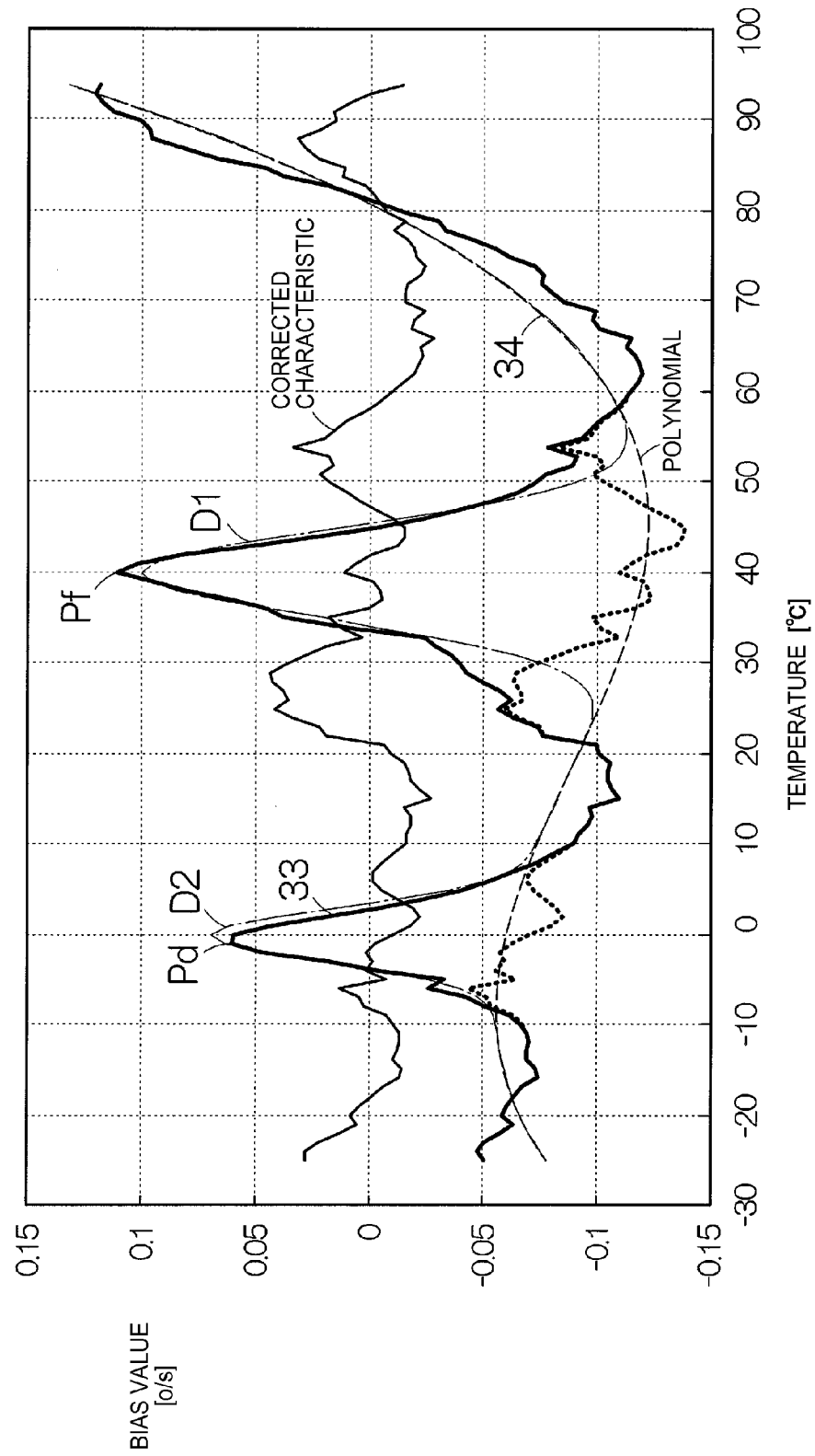
FIG. 18 is a graph showing an approximate compensated waveform with respect to the waveform of the variation characteristic.

As a result, as shown in FIG. 18, the approximation formula can be obtained by superposing the two first formulas and one second formula with each other. Since the approximation by the first formula formed of the exponential function is performed first, and then the approximation by the second formula formed of the polynomial equation is performed on the waveform, which has been compensated with the first formula, using the method of least squares, the final approximate compensated waveform has a feature of the approximation by the method of least squares that the error on the positive side and the error on the negative side are equal to each other. Since the average of the final compensated waveform approximated becomes zero, there is kept the feature that the error is difficult to increase even if the characteristic varying along this waveform is added.

Figure 19:
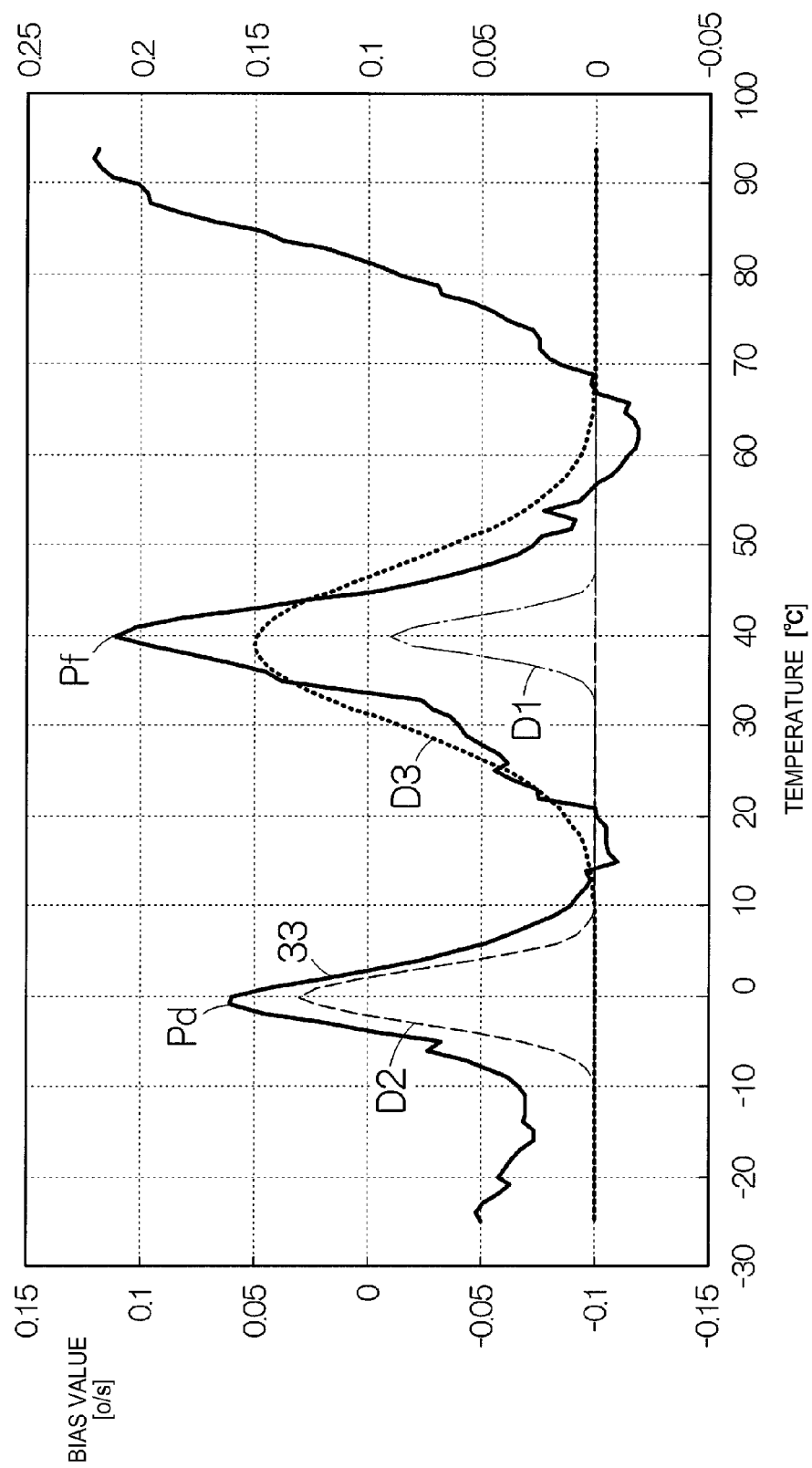
FIG. 19 is a graph showing a curve expressed by the first formula related to another embodiment of the invention.
Figure 20:
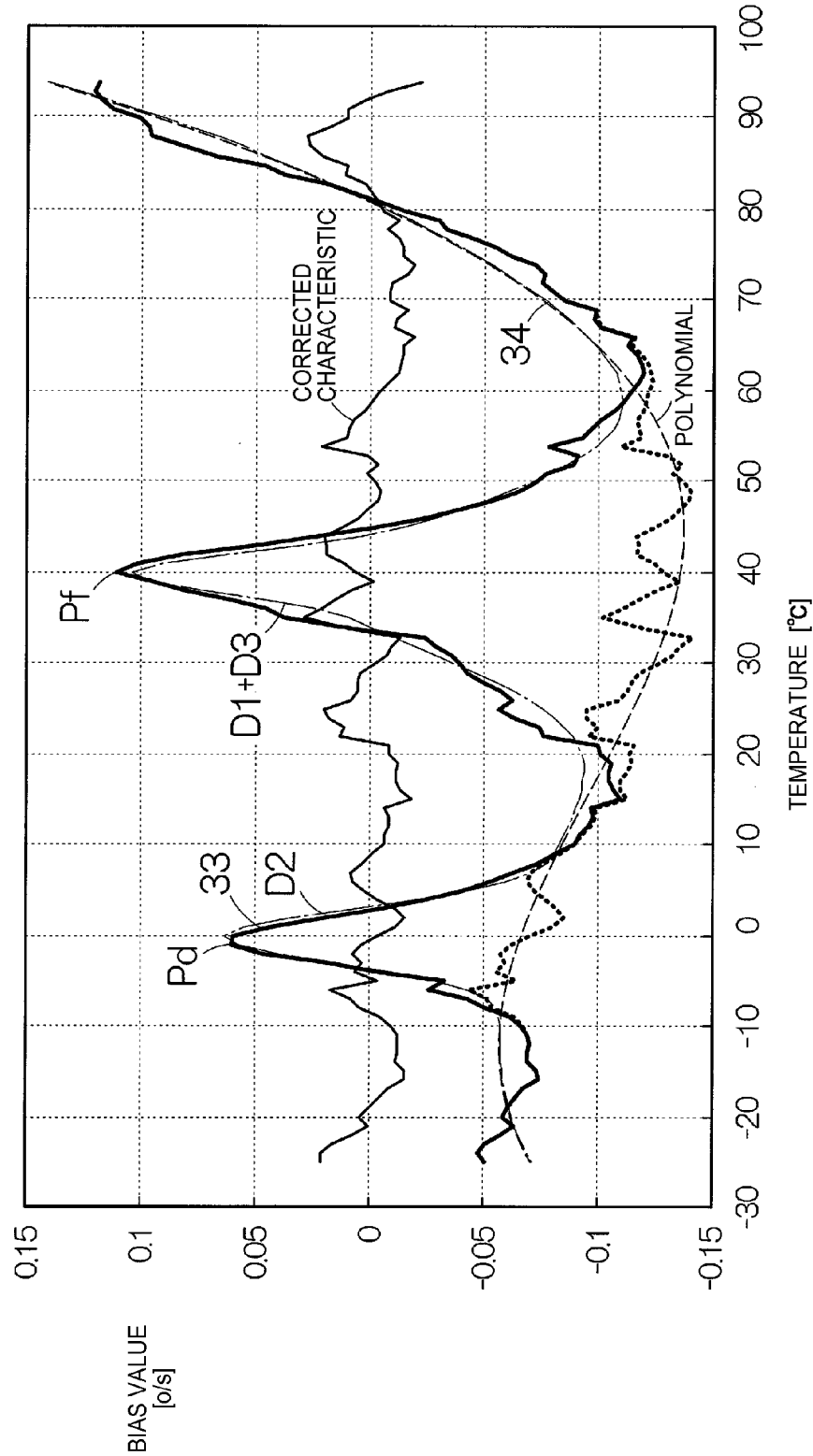
FIG. 20 is a graph showing an approximate compensated waveform with respect to the waveform of the variation characteristic.
Figure 21:
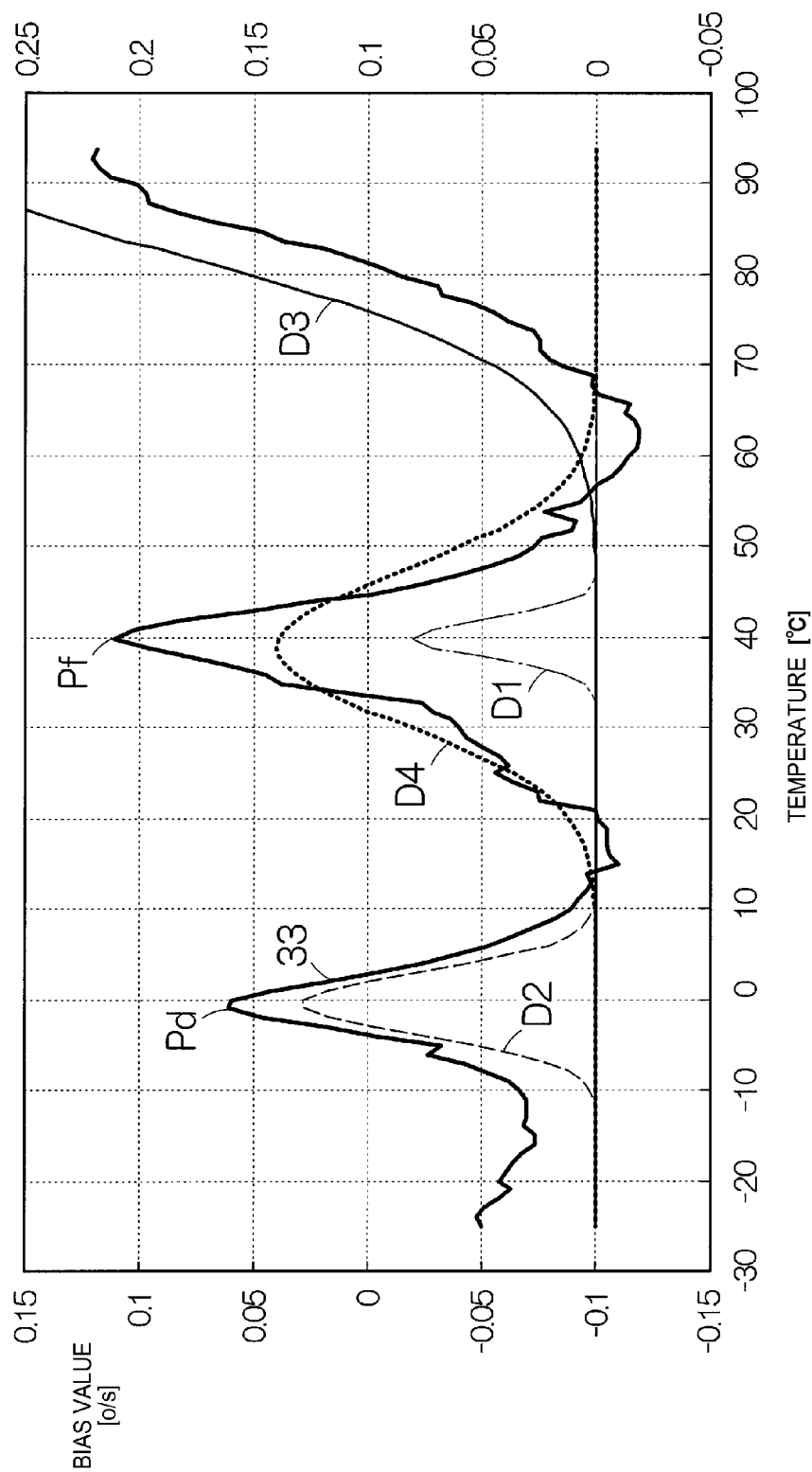
FIG. 21 is a graph showing a curve expressed by the first formula related to still another embodiment of the invention.
Figure 22:
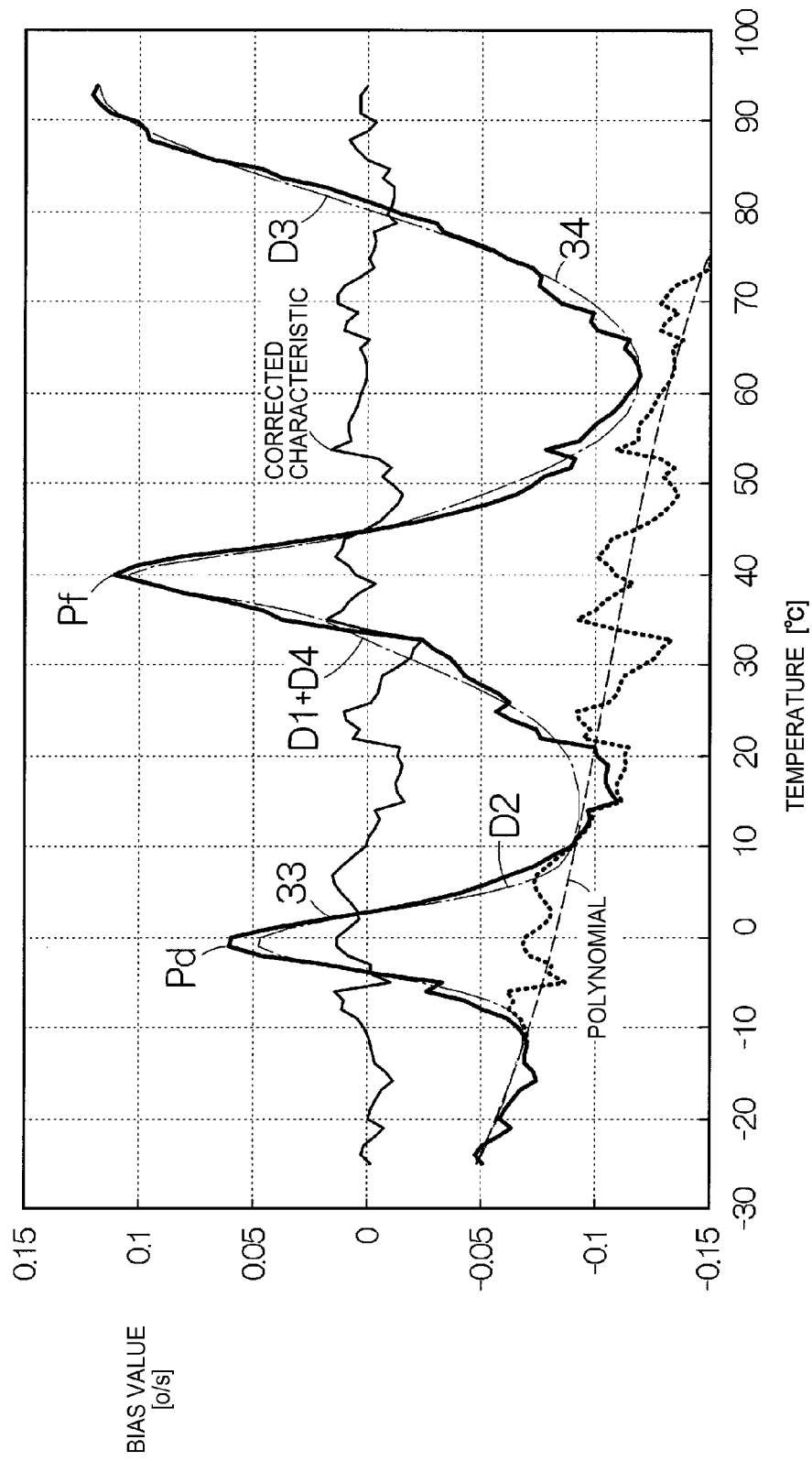
FIG. 22 is a graph showing an approximate compensated waveform with respect to the waveform of the variation characteristic.
Figure 23:
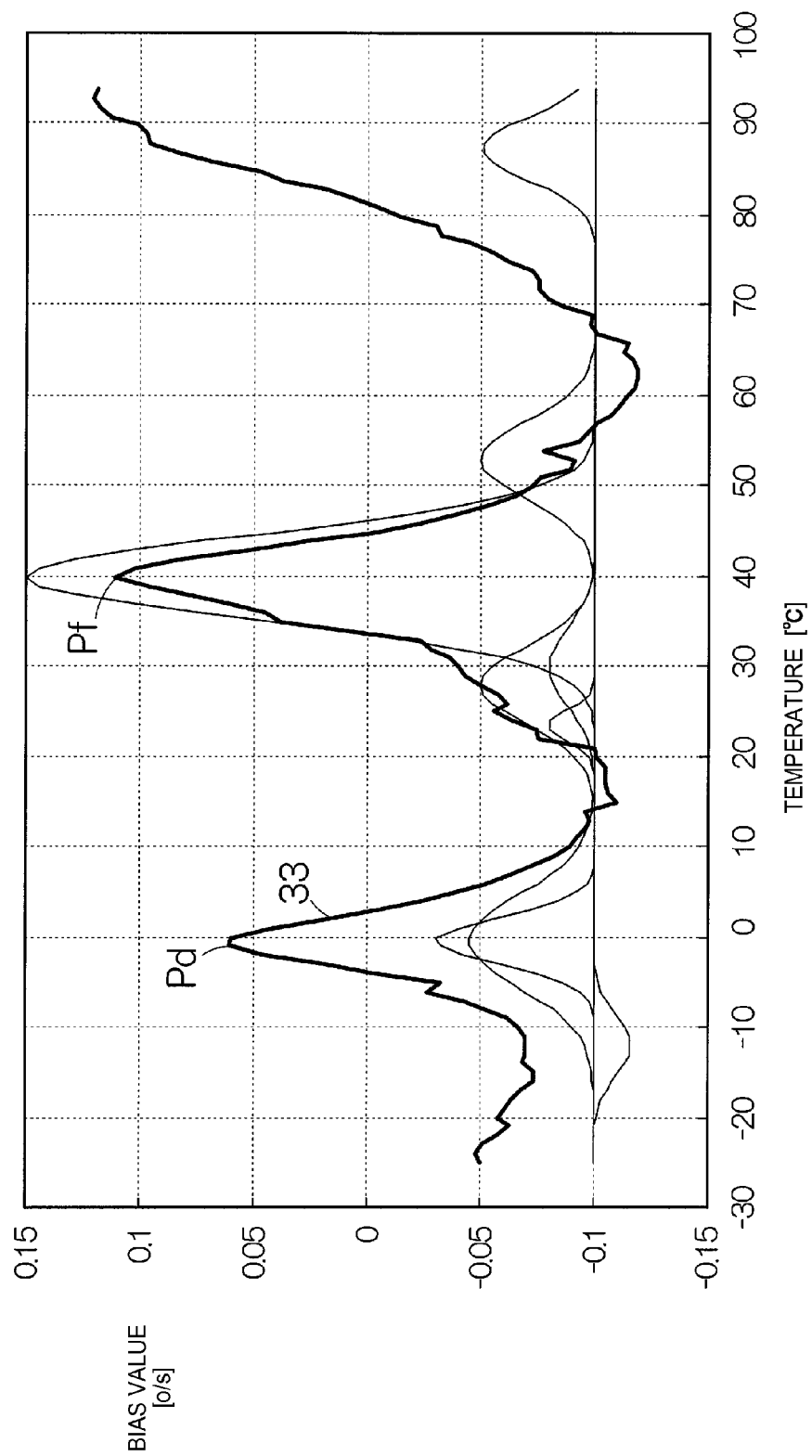
FIG. 23 is a graph showing a curve expressed by the first formula related to still another embodiment of the invention.
Figure 24:
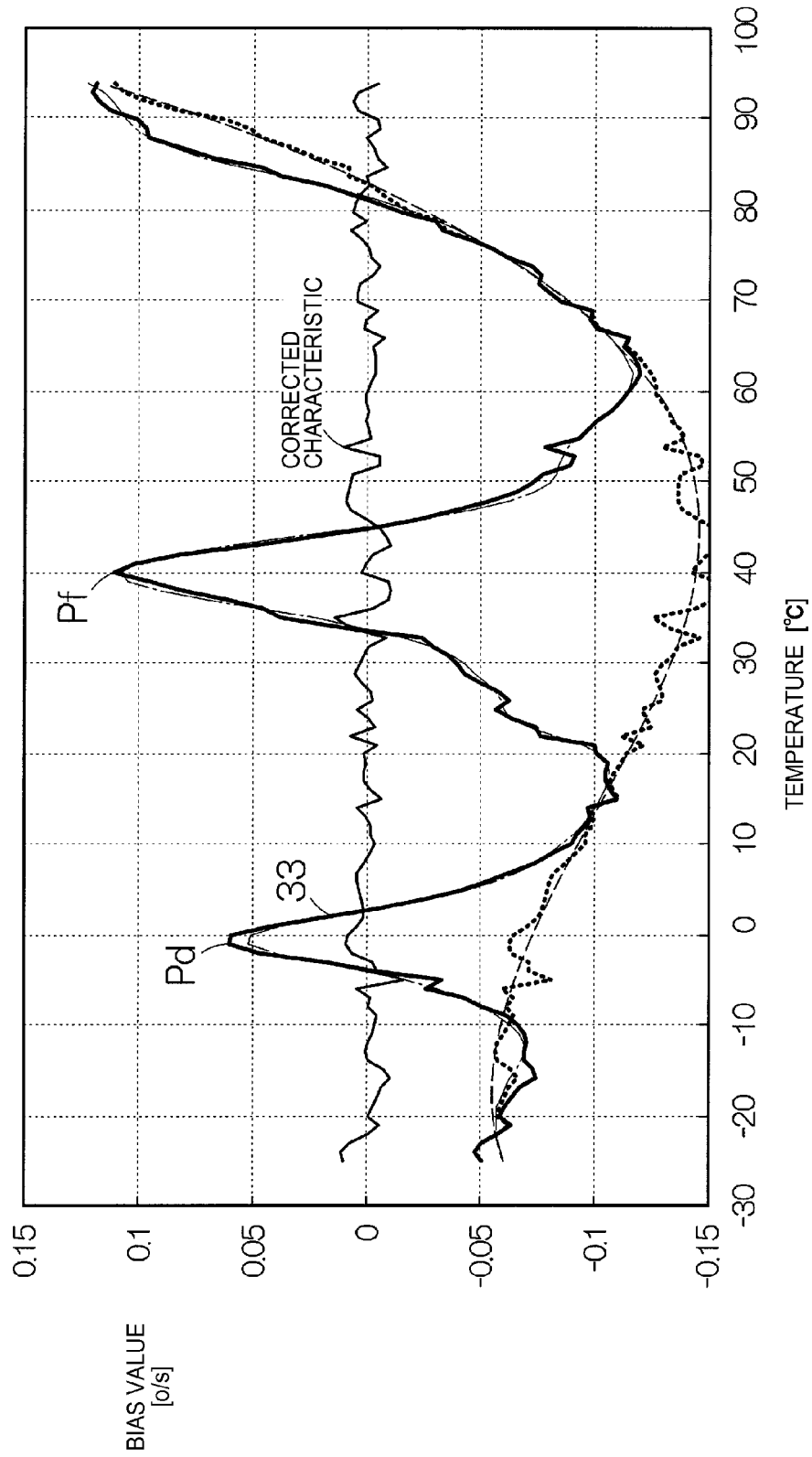
FIG. 24 is a graph showing an approximate compensated waveform with respect to the waveform of the variation characteristic.

Further, as shown in, for example, FIG. 19, the same second range is expressed by the superposition of a plurality of the first formulas D1, D3. Here, the two first formulas D1, D3 are different in width w from each other. As a result, as shown in FIG. 20, it is possible for the approximation formula to become more approximate to the actual temperature characteristic. Further more, as shown in, for example, FIG. 21, the second range is added when needed. Thus, as is obvious from FIG. 22, degree of approximation is further raised. As shown in FIGS. 23 and 24, if the number of the first formulas is increased (here 9 formulas), planarization of the temperature characteristic after the correction is promoted. When expressing the variation in data with variance, the variance $\sigma=0.06656$ in the original temperature characteristic turns to the variance $\sigma=0.00528$ after the correction, and the error is reduced to around 8%.

4. Method of Manufacturing Sensor Device

In manufacturing the sensor device 11, the temperature characteristic of the zero point is actually measured as shown in, for example, FIG. 3. In the actual measurement, the angular velocity applied to the gyro sensor 12 is kept to "zero." The temperature variation is caused throughout the first range with a constant variation. The output of the gyro sensor 12 is measured.

Figure 25:
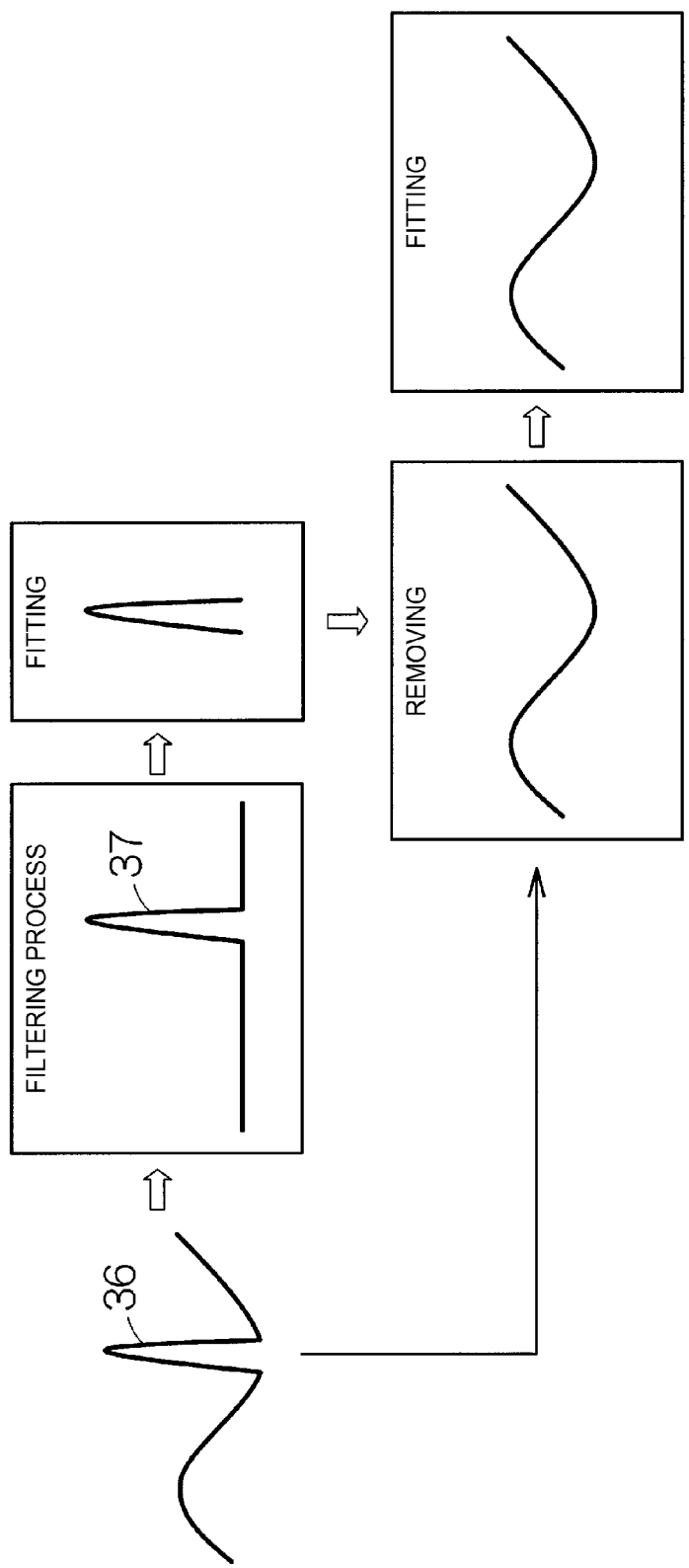
FIG. 25 is a conceptual diagram schematically showing a generation method of an approximate curve in the case in which a single peak value exists.

As shown in FIG. 25, a filtering process is performed on the output of the gyro sensor 12. As a result, a peak waveform having one peak value in the second range narrower than the first range is separated. The fitting of the first formula is performed on the peak waveform thus separated.

$$D_{(T,w,h)} = h_0 \cdot 2^{-\left(\frac{T-T_0}{w}\right)^2} \quad \text{Formula 14}$$

Here, as described below, sequences of numbers of local waveforms are set to data pairs.

$$h_n; n=1, 2, \ldots, n$$

$$T_n; n=1, 2, \ldots, n \quad \text{Formula 15}$$

The center temperature $T_0$ of the peak value is extracted in accordance with a sorting process. Displacement $\Delta T/w$ is set based on the position of the center temperature $T_0$. This is regarded as an adjustment of the scale reduction using the width w. A variable $\omega$ is introduced.

$$\frac{\Delta T}{w} = \omega \Delta T \quad \text{Formula 16}$$

Normalization to the height $h_0=1$ is performed.

$$D_{(T,\omega,h)} = h_0 \cdot 2^{-\omega^2 T^2} \quad \text{Formula 17}$$

$$\frac{D_{(T,\omega,h)}}{h_0} = 2^{-\omega^2 T^2}$$

The logarithms of the both sides are obtained with respect to the normalized waveform Dh.

$$D_h = 2^{-\omega^2 T^2} \quad \text{Formula 18}$$

$$\log_2 D_h = \log_2\left(2^{-\omega^2 T^2}\right) = -\omega^2 T^2 \quad \text{Formula 19}$$

This process is equivalent to performing the following operation on the data pairs described above.

$$\log_2 D_{h_n} = \log_2 \frac{h_n}{h_0}; n=1, 2, \ldots, n \quad \text{Formula 20}$$

$$T_n = T_n - T_0; n=1, 2, \ldots, n$$

The second-order polynomial equation $y=ax^2$, and the error $\Delta E$ are set as follows.

$$y = ax^2 + \Delta E$$

$$\Delta E = y - ax^2 \quad \text{Formula 21}$$

The both sides are squared and then partially differentiated by the coefficient "a." The result is set to zero.

$$\Delta E = y - ax^2 \quad \text{Formula 22}$$

$$\Delta E^2 = (y - ax^2)^2 = y^2 - 2ax^2 y + a^2 x^4$$

$$\frac{\partial}{\partial a} \Delta E^2 = -2x^2 y + 2ax^4 = 0$$

$$ax^4 = x^2 y$$

Since the relationship is fulfilled in all of the data described above, the following can be obtained.

$$a \sum_{i=1}^{n} x_i^4 = \sum_{i=1}^{n} x_i^2 y \quad \text{Formula 23}$$

$$a = \frac{\sum_{i=1}^{n} x_i^2 y}{\sum_{i=1}^{n} x_i^4}$$

As a result, the second-order coefficient is as follows.

$$a \sum_{i=1}^{n} T_i^4 = \sum_{i=1}^{n} T_i^2 \log_2 D_{hi} \quad \text{Formula 24}$$

-continued $$a = \frac{\sum_{i=1}^{n} T_i^2 \log_2 D_{hi}}{\sum_{i=1}^{n} T_i^4}$$

Therefore, in view of the relation of Formula 25 below, Formula 26 is obtained.

$$\log_2 D_h = -\omega^2 T^2 = aT^2 \quad \text{Formula 25}$$

$$\omega = \sqrt{a} \quad \text{Formula 26}$$

Further, in view of the relation of Formula 27, Formula 28 can be obtained.

$$\frac{\Delta T}{w} = \omega \Delta T \quad \text{Formula 27}$$

$$w = \frac{1}{\omega} = \frac{1}{\sqrt{a}} \quad \text{Formula 28}$$

Due to the operation described above, the approximate curve with the exponent using the method of least squares can be obtained.

$$D_{(T)} = h_0 \cdot 2^{-a(T-T_0)^2} \quad \text{Formula 29}$$

In this calculation process, the range of the exponential term is as follows.

$$-a(T-T_0)^2 \leq 0 \quad \text{Formula 30}$$

Since the approximation thus obtained is the following waveform, the polarity is adjusted in advance in accordance with the height $h_0$ of the waveform.

$$2^{-a(T-T_0)^2} \geq 0 \quad \text{Formula 31}$$

Figure 26:
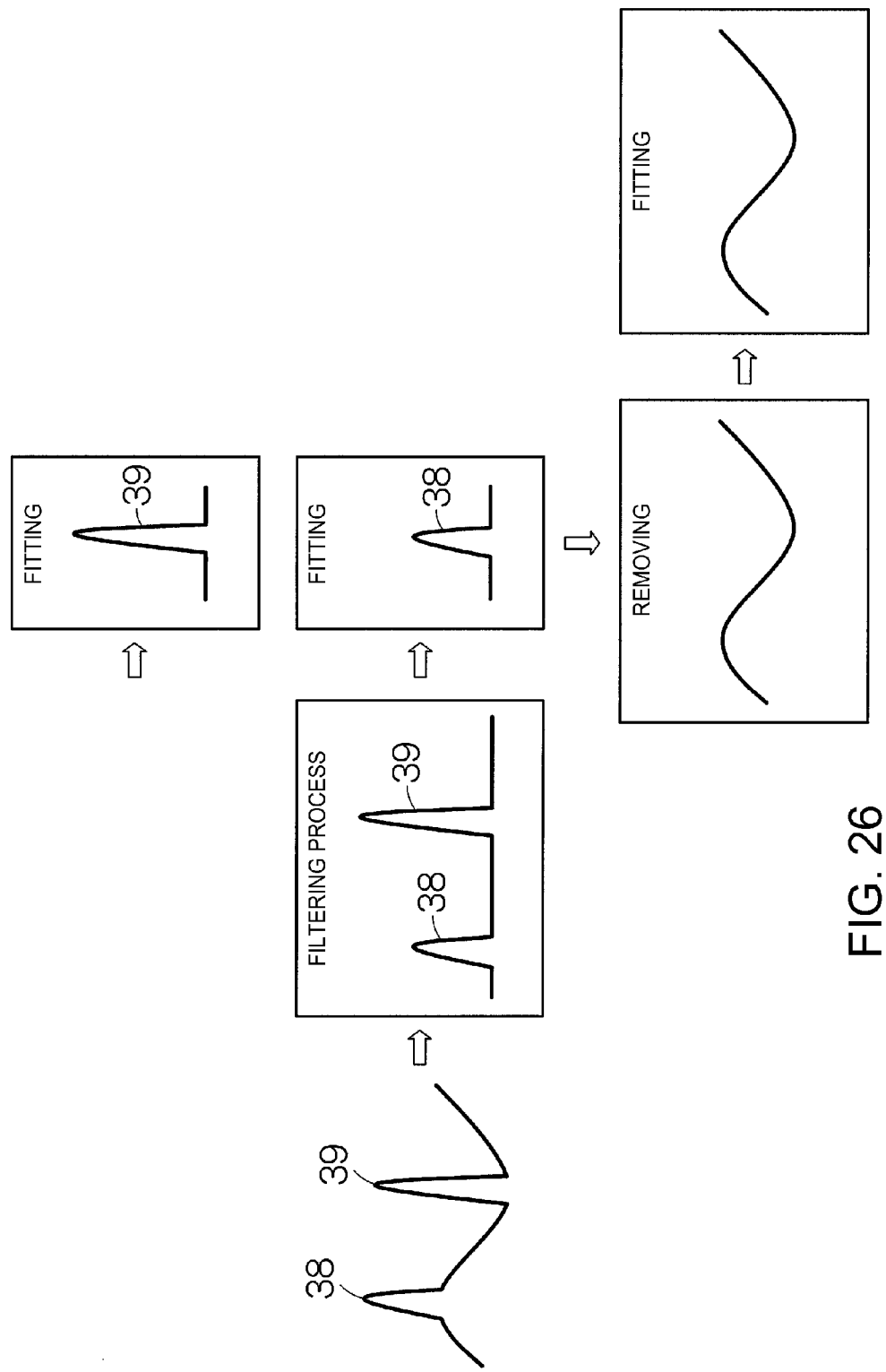
FIG. 26 is a conceptual diagram schematically showing a generation method of an approximate curve in the case in which a plurality of peak values exists.
Figure 27:
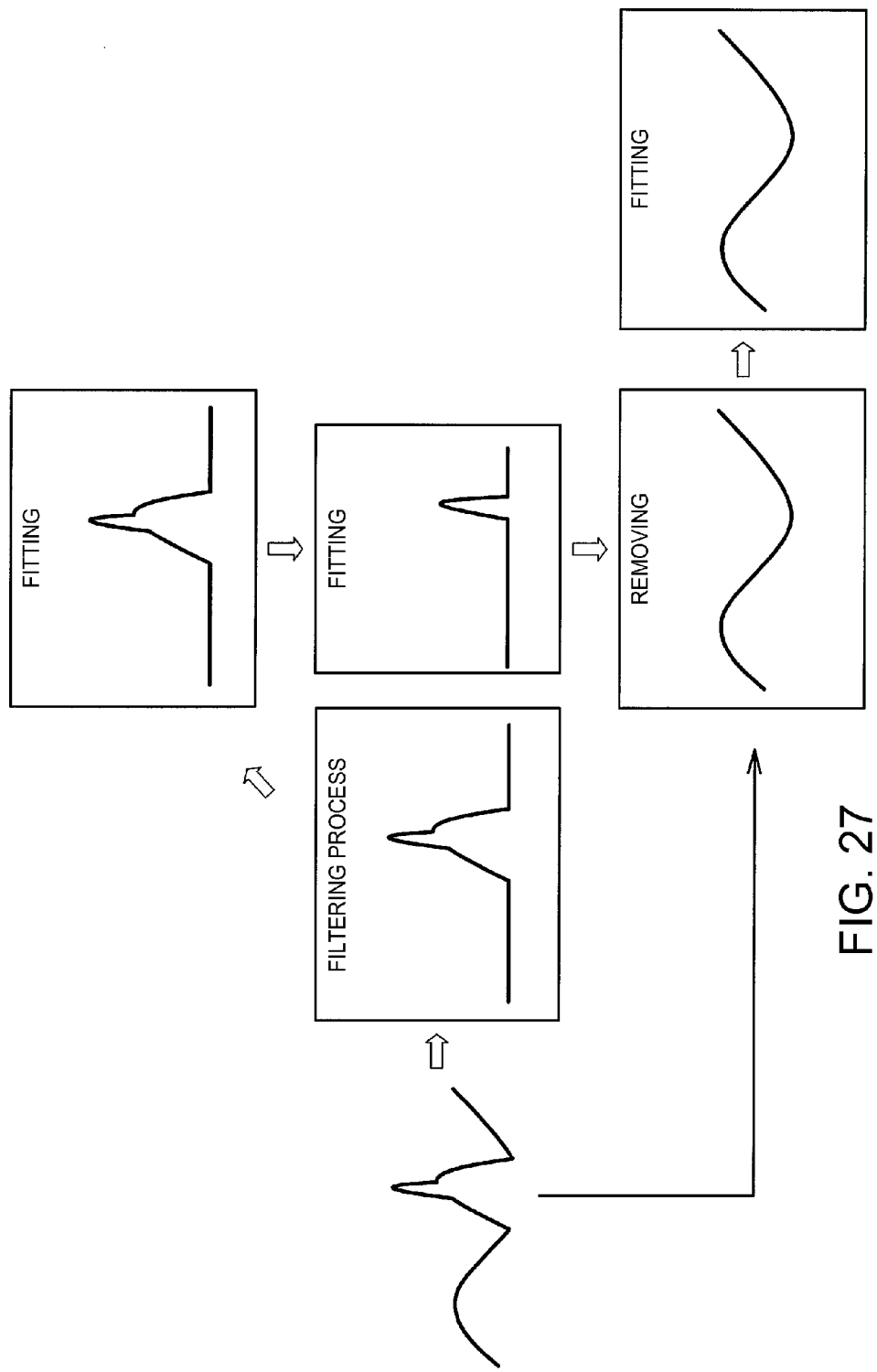
FIG. 27 is a conceptual diagram schematically showing a generation method of an approximate curve in the case in which the shape of the waveform is complicated.

As shown in FIG. 26, in the case in which a plurality of peak values exists in the data column, the respective second ranges are separately considered. As shown in FIG. 27, in the case in which the shape of the waveform is complicated, local variations can be removed by repeating the approximation.

5. Electronic Apparatus and so on

Figure 28:
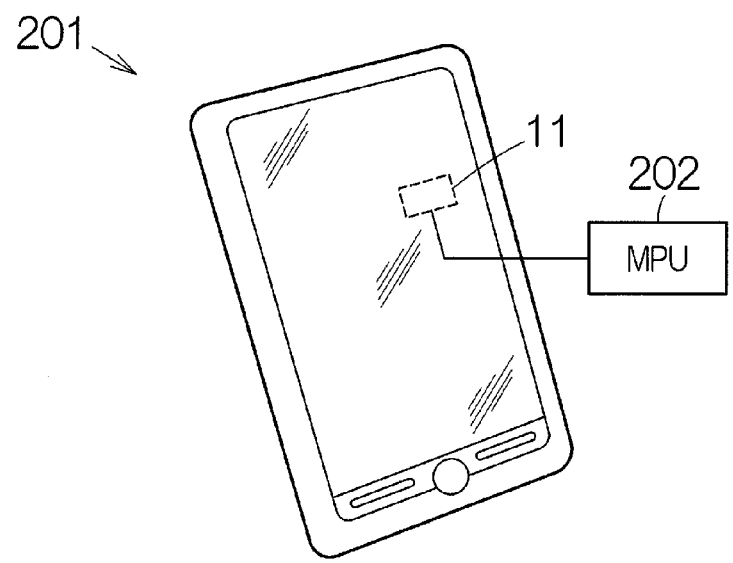
FIG. 28 is a conceptual diagram schematically showing a configuration of a smartphone as an example of an electronic apparatus.

FIG. 28 schematically shows a smartphone 201 as a specific example of an electronic apparatus. The smartphone 201 incorporates the sensor device 11. The sensor device 11 can detect the posture of the smartphone 201. So-called motion sensing is performed. A detection signal of the sensor device 11 is supplied to, for example, a microcomputer chip (MPU) 202. The MPU 202 is capable of performing a variety of processes in accordance with the motion sensing. Besides the above, such motion sensing is used in an electronic apparatus such as a cellular phone, a portable gaming machine, a gaming controller, a car navigation system, a pointing device, a head-mounted display, or a tablet personal computer. In realizing the motion sensing, the sensor device 11 can be incorporated.

Figure 29:
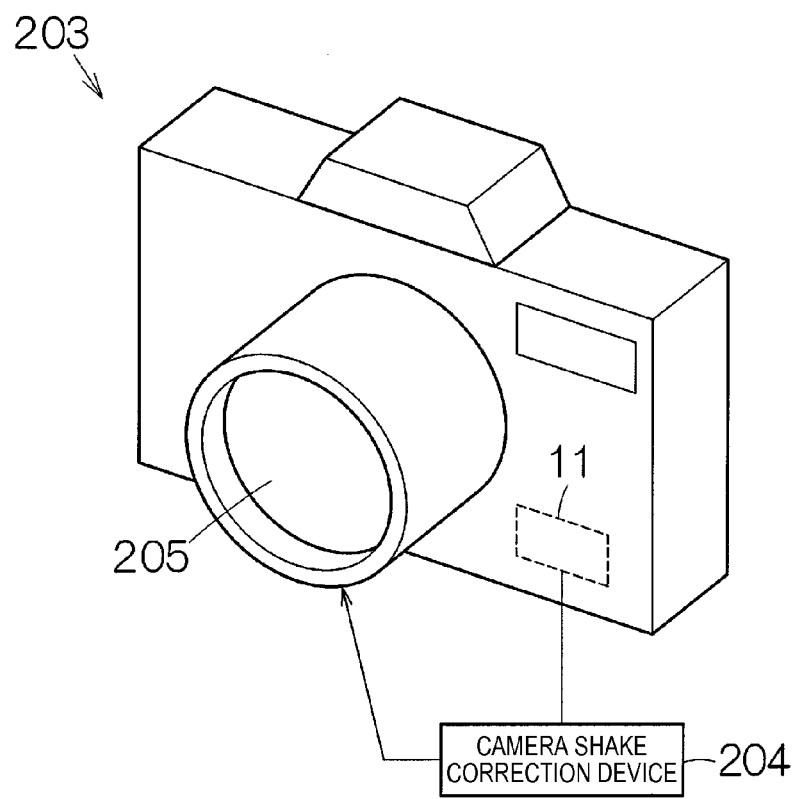
FIG. 29 is a conceptual diagram schematically showing a configuration of a digital still camera as another specific example of the electronic apparatus.

FIG. 29 schematically shows a digital still camera (hereinafter referred to as a "camera") 203 as another specific example of the electronic apparatus. The camera 203 incorporates the sensor device 11. The sensor device 11 can detect the posture of the camera 203. A detection signal of the sensor device 11 is supplied to a camera shake correction device 204. The camera shake correction device 204 can move, for example, a specific lens in a lens set 205 in accordance with the detection signal of the sensor device 11. In such a manner, the camera shake is corrected. Besides the above, the camera shake correction is used in a digital video camera. In realizing the camera shake correction, the sensor device 11 can be incorporated.

Figure 30:
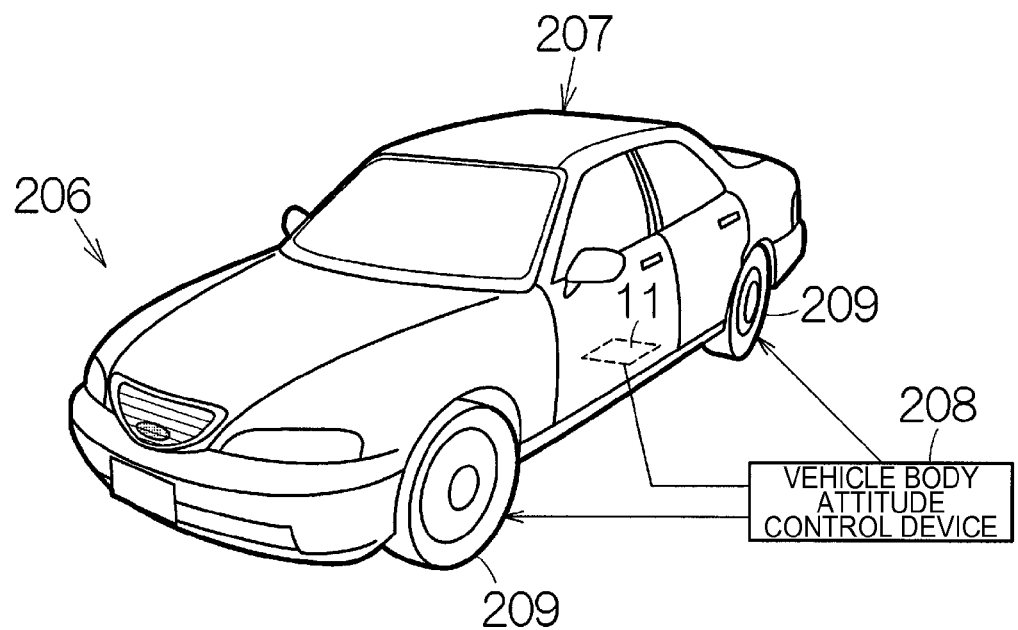
FIG. 30 is a conceptual diagram schematically showing a configuration of a vehicle as a specific example of a moving object.

FIG. 30 schematically shows a vehicle 206 as a specific example of a moving object. The vehicle 206 incorporates the sensor device 11. The sensor device 11 can detect the posture of the vehicle body 207. A detection signal of the sensor device 11 is supplied to a vehicle body attitude control device 208. The vehicle body attitude control device 208 is capable of, for example, controlling the stiffness of the suspension, and controlling the brake of each of the wheels 209 in accordance with the attitude of the vehicle body 207. Besides the above, such attitude control as described above can be used for a variety of moving objects such as a two-legged robot, an aircraft, and a helicopter. In realizing the attitude control, the sensor device 11 can be incorporated.

It should be noted that although the present embodiment is hereinabove explained in detail, it should easily be understood by those skilled in the art that it is possible to make a variety of modifications not substantially departing from the novel matters and the advantages of the invention. Therefore, such modified examples are all included in the scope of the invention. For example, a term described at least once with a different term having a broader sense or the same meaning in the specification or the accompanying drawings can be replaced with the different term in any part of the specification or the accompanying drawings. Further, the configurations and the operations of the sensor device 11, the gyro sensor 12, the control circuit 14, the temperature measuring element 16, and so on are not limited to those explained in the description of the present embodiments, but can variously be modified.

The entire disclosure of Japanese Patent Application No. 2013-235407, filed Nov. 13, 2013 is expressly incorporated by reference herein.

What is claimed is:

1. A temperature characteristic correction device adapted to correct a temperature characteristic of an electronic device,
    the temperature characteristic correction device:
        calculates a peak correction characteristic approximating a peak waveform having a peak value in a second range included in a first range of the temperature characteristic using a first formula, and a correction characteristic approximating a waveform continuing in the first range of the temperature characteristic using a second formula that is based upon the peak waveform;
        calculates a total correction amount from the peak correction characteristic and the correction characteristic; and
        corrects a zero point of the temperature characteristic using the total correction amount,
        wherein an electrical signal indicative of a measured physical quantity associated with the electronic device is modified based upon the corrected zero point.

2. The temperature characteristic correction device according to claim 1,
    wherein the temperature characteristic correction device receives a parameter signal for identifying temperature, calculates the total correction amount in accordance with the temperature, and corrects the temperature characteristic.

3. The temperature characteristic correction device according to claim 1, wherein
the first formula is an exponential function.

4. The temperature characteristic correction device according to claim 3, wherein
the second formula is a polynomial.

5. The temperature characteristic correction device according to claim 1, wherein
in a case in which a plurality of the peak waveforms exist in the first range, the peak correction characteristics are separately set using the first formula in a descending order of a ratio of a height of the peak to a width of the peak.

6. The temperature characteristic correction device according to claim 1,
wherein the temperature characteristic correction device performs a filtering process on the temperature characteristic of the electronic device to separate the waveform continuing in the first range and the peak waveform from each other, and
calculates the peak correction characteristic using the first formula based on the peak waveform separated.

7. An electronic device comprising:
the temperature characteristic correction device according to claim 1 incorporated in the electronic device.

8. An electronic apparatus comprising:
the electronic device according to claim 7.

9. A moving object comprising:
the electronic device according to claim 7.

10. A temperature characteristic correction formula determination method comprising:

changing temperature to identify a temperature characteristic of an electronic device;
obtaining a peak correction characteristic by approximating a peak waveform having a peak value in a second range included in a first range of the temperature characteristic using a first formula;
obtaining a correction characteristic by approximating a waveform continuing in the first range of the temperature characteristic using a second formula that is based upon the peak waveform;
obtaining a computational formula for calculating a total correction amount from the peak correction characteristic and the correction characteristic; and
correcting a zero point of the temperature characteristic using the total correction amount.

11. A control circuit adapted to correct a temperature characteristic of an electronic device,
the control circuit:
calculates a peak correction characteristic approximating a peak waveform having a peak value in a second range included in a first range of the temperature characteristic using a first formula, and a correction characteristic approximating a waveform continuing in the first range of the temperature characteristic using a second formula that is based upon the peak waveform;
calculates a total correction amount from the peak correction characteristic and the correction characteristic; and
corrects a zero point of the temperature characteristic using the total correction amount.

* * * * *